(12) United States Patent
Yaghoubi et al.

(10) Patent No.: US 12,576,865 B2
(45) Date of Patent: Mar. 17, 2026

(54) CONTROL SYSTEM TESTING UTILIZING RULEBOOK SCENARIO GENERATION

(71) Applicant: Motional AD LLC, Boston, MA (US)

(72) Inventors: Shakiba Yaghoubi, Cambridge, MA (US); Calin Belta, Sherborn, MA (US); Noushin Mehdipour, Allston, MA (US); Radboud Duintjer Tebbens, Newton Center, MA (US)

(73) Assignee: Motional AD LLC, Boston, MA (US)

( * ) Notice: Subject to any disclaimer, the term of this patent is extended or adjusted under 35 U.S.C. 154(b) by 181 days.

(21) Appl. No.: 18/071,463

(22) Filed: Nov. 29, 2022

(65) Prior Publication Data

US 2024/0059302 A1 Feb. 22, 2024

Related U.S. Application Data

(60) Provisional application No. 63/371,855, filed on Aug. 18, 2022.

(51) Int. Cl.
*B60W 50/06* (2006.01)
*B60W 60/00* (2020.01)

(52) U.S. Cl.
CPC ........ *B60W 50/06* (2013.01); *B60W 60/0011* (2020.02); *B60W 60/0015* (2020.02);
(Continued)

(58) Field of Classification Search
CPC ............. B60W 50/06; B60W 60/0015; B60W 60/0011; B60W 2554/408;
(Continued)

(56) References Cited

U.S. PATENT DOCUMENTS 9,645,577 B1 * 5/2017 Frazzoli ................ B60W 30/00
11,577,741 B1 * 2/2023 Reschka ........... B60W 30/0953
(Continued)

FOREIGN PATENT DOCUMENTS

WO WO-2024065671 A1 * 4/2024 ............. G06N 3/006

OTHER PUBLICATIONS

Lei Yang, An Adaptive Cruise Control Method Based on Improved Variable Time Headway Strategy and Particle Swarm Optimization Algorithm, Sep. 24, 2020, IEEE, IEEE Access vol. 8 (Year: 2020).*
(Continued)

*Primary Examiner* — Matthias S Weisfeld
(74) *Attorney, Agent, or Firm* — Knobbe, Martens, Olson & Bear, LLP

(57) ABSTRACT

Provided are methods for testing of a control system of a vehicle using generated rulebook based scenarios, which can include determining a simulated environment, receiving a hierarchical plurality of autonomous vehicle rules, determining a trajectory of a simulated vehicle within the simulated environment, generating a plurality of simulated scenarios for the simulated vehicle, identifying at least one violation of at least one autonomous vehicle rule by the simulated vehicle in a set of the simulated scenarios, determining a scenario score for each simulated scenario based on the violations, and identifying at least one simulated scenario for a trained neural network of a vehicle based on the scenario scores.

20 Claims, 15 Drawing Sheets

(52) U.S. Cl.
CPC ............... *B60W 2554/4026* (2020.02); *B60W 2554/4029* (2020.02); *B60W 2554/4046* (2020.02); *B60W 2554/408* (2020.02)

(58) Field of Classification Search
CPC . B60W 2554/4026; B60W 2554/4029; B60W 2554/4046
USPC .......................................................... 701/25
See application file for complete search history.

(56) References Cited

U.S. PATENT DOCUMENTS

| | | | | |
|---|---|---|---|---|
| 11,891,088 | B1 * | 2/2024 | Kobilarov | ............ G07C 5/0808 |
| 12,060,060 | B1 * | 8/2024 | Costantino | ............ G06F 16/285 |
| 2020/0192391 | A1 * | 6/2020 | Vora | ..................... G05D 1/0088 |
| 2020/0356849 | A1 | 11/2020 | Xu et al. | |
| 2022/0187837 | A1 | 6/2022 | Tebbens et al. | |
| 2024/0034353 | A1 * | 2/2024 | Cao | ........................ B60W 60/00 |
| 2024/0143491 | A1 * | 5/2024 | Peters | ................. G06F 11/3684 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

International Search Report and Written Opinion received for PCT Application No. PCT/US2023/072283, mailed Nov. 17, 2023.

Dolgov, D. et al., "Practical Search Techniques in Path Planning for Autonomous Driving", American Association for Artificial Intelligence, 2008, pp. 1-6.

Hoel, C.-J. et al., "Combining Planning and Deep Reinforcement Learning in Tactical Decision Making for Autonomous Driving", IEEE Transactions on Intelligent Vehicles, vol. 5, No. 2, 2019, pp. 1-12.

Liu, C. et al., "Path Planning for Autonomous Vehicles Using Model Predictive Control", 2017 IEEE Intelligent Vehicles Symposium, 2017, pp. 1-6.

Paden, B. et al., "A Survey of Motion Planning and Control Techniques for Self-Driving Urban Vehicles", IEEE Transactions on Intelligent Vehicles, vol. 1, No. 1, 2016, pp. 1-27.

* cited by examiner

600

800

900

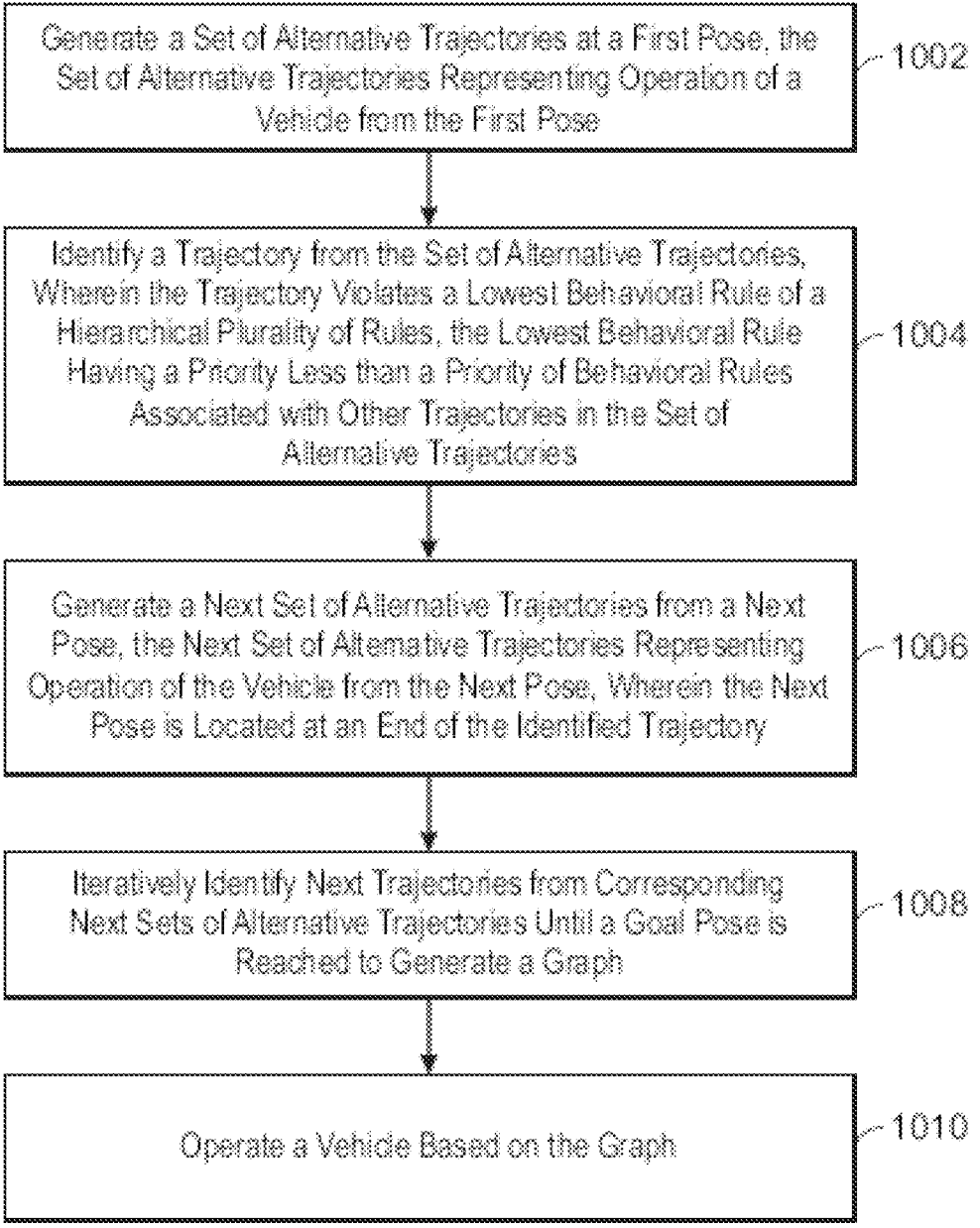

Generate a Set of Alternative Trajectories at a First Pose, the Set of Alternative Trajectories Representing Operation of a Vehicle from the First Pose ⌐1002

Identify a Trajectory from the Set of Alternative Trajectories, Wherein the Trajectory Violates a Lowest Behavioral Rule of a Hierarchical Plurality of Rules, the Lowest Behavioral Rule Having a Priority Less than a Priority of Behavioral Rules Associated with Other Trajectories in the Set of Alternative Trajectories ⌐1004

Generate a Next Set of Alternative Trajectories from a Next Pose, the Next Set of Alternative Trajectories Representing Operation of the Vehicle from the Next Pose, Wherein the Next Pose is Located at an End of the Identified Trajectory ⌐1006

Iteratively Identify Next Trajectories from Corresponding Next Sets of Alternative Trajectories Until a Goal Pose is Reached to Generate a Graph ⌐1008

Operate a Vehicle Based on the Graph ⌐1010

Computing
Device
1104

Parameter
Data
1106

Signal Processing System 1102

Signal Processor
1108

Rule Data
1112

Computing
Device
1110

Computing
Device
1114

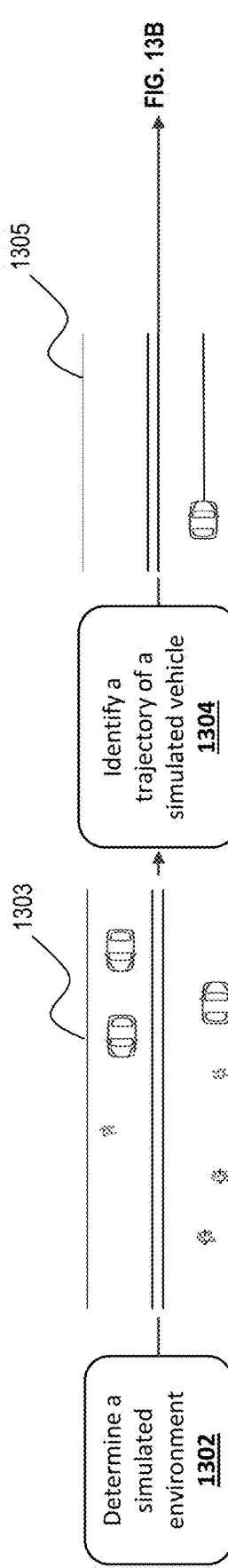
FIG. 13A

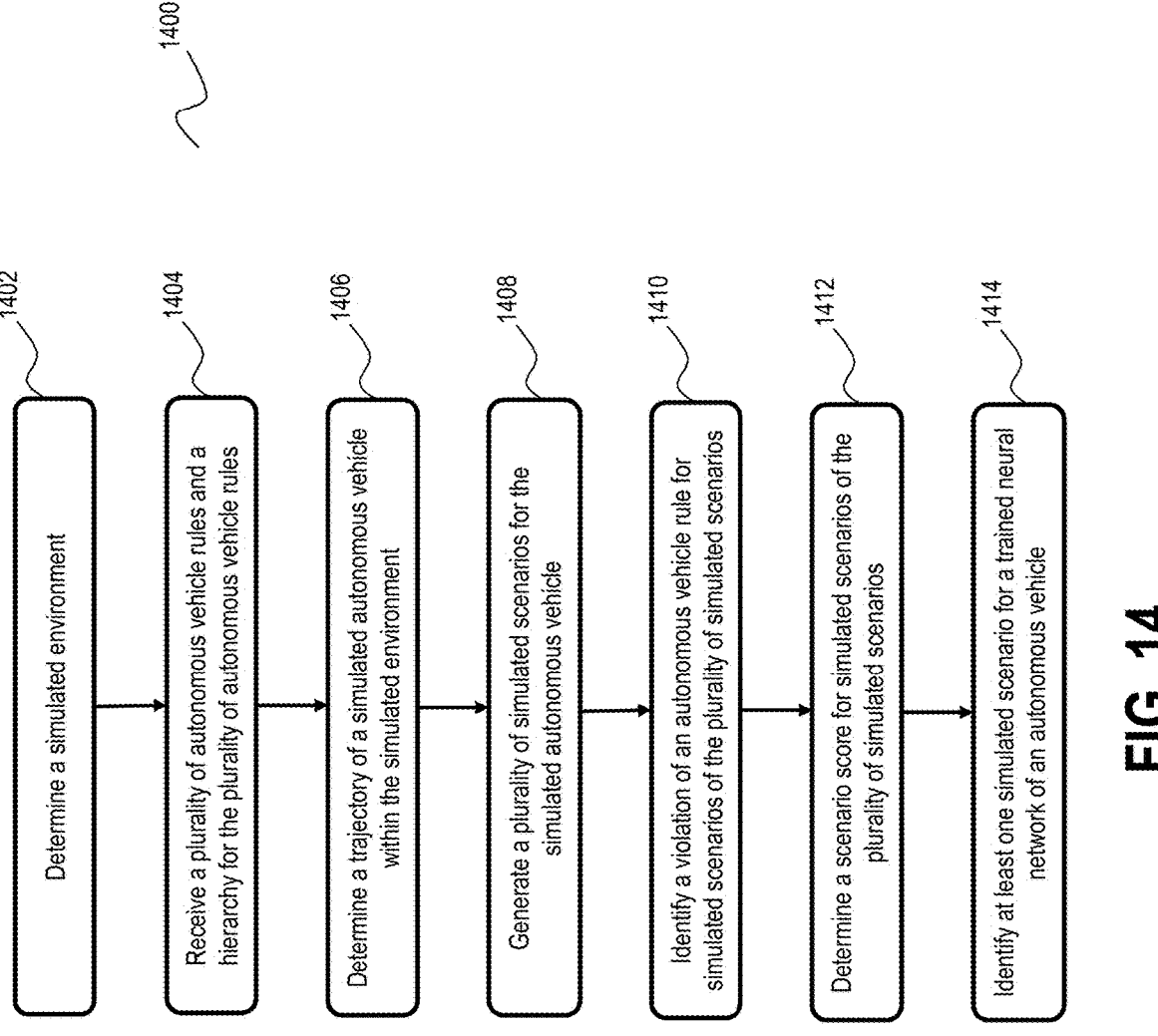

1400

1402 Determine a simulated environment

1404 Receive a plurality of autonomous vehicle rules and a hierarchy for the plurality of autonomous vehicle rules 1406 Determine a trajectory of a simulated autonomous vehicle within the simulated environment 1408 Generate a plurality of simulated scenarios for the simulated autonomous vehicle 1410 Identify a violation of an autonomous vehicle rule for simulated scenarios of the plurality of simulated scenarios 1412 Determine a scenario score for simulated scenarios of the plurality of simulated scenarios 1414 Identify at least one simulated scenario for a trained neural network of an autonomous vehicle

FIG. 14

CONTROL SYSTEM TESTING UTILIZING RULEBOOK SCENARIO GENERATION

RELATED APPLICATIONS

This application claims priority under 35 U.S.C. § 119(e) to U.S. Provisional Patent Application No. 63/371,855, filed Aug. 18, 2022 and entitled "CONTROL SYSTEM TESTING UTILIZING RULEBOOK SCENARIO GENERATION," which is incorporated herein by reference in its entirety.

BACKGROUND

Self-driving vehicles typically use many decisions during operation. Executing the decisions can be difficult and complicated due to potential driving requirements enforced by traffic laws, cultural expectations, safety considerations, driving norms, etc. as well as their relative priorities.

BRIEF DESCRIPTION OF THE FIGURES

FIG. 10 is a flowchart of a process for graph exploration for trajectory generation.

FIG. 13A is a flow diagram illustrating an example identification of a trajectory and a simulated environment of a simulated vehicle;

FIG. 14 is a flow diagram illustrating an example of a routine implemented by one or more processors to identify a simulated scenario for a simulated vehicle.

DETAILED DESCRIPTION

Figure 1:
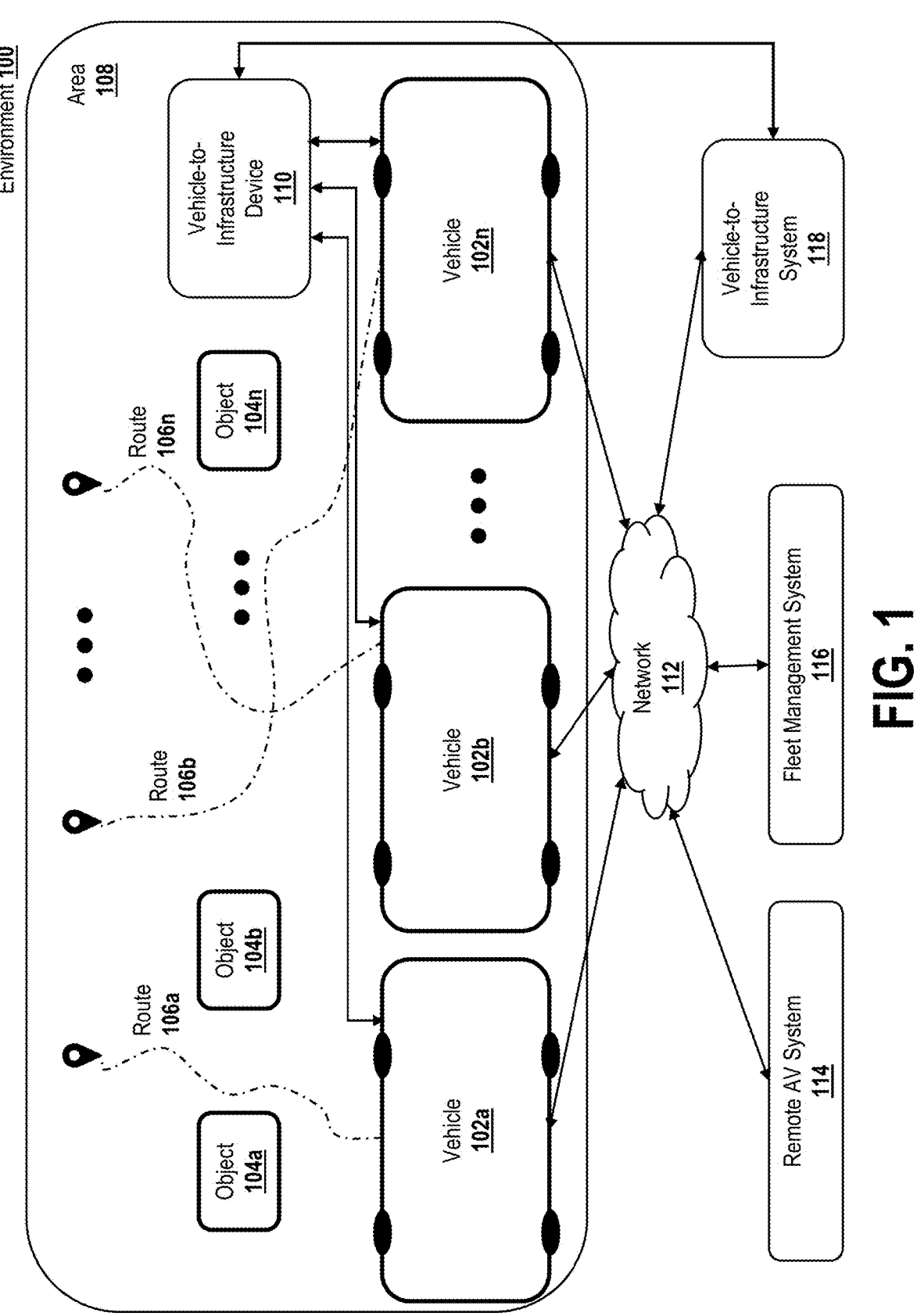
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a signal processing system that selects a simulated scenario for testing a control system of a vehicle using a hierarchical plurality of rules. The signal processing system can determine a simulated environment for a simulated vehicle. The simulated environment can include a plurality of simulated environment parameters and at least one simulated agent that operates according to agents parameters. The signal processing system can identify a trajectory or pose of a simulated vehicle within the simulated environment. For example, the trajectory or pose can identify movement of the simulated vehicle from a first pose to a second pose. For a particular simulated scenario, the trajectory or pose may cause the simulated vehicle to violate a rule from a hierarchical plurality of rules. As each simulated scenario may include different environmental parameters, environmental agents, and/or environmental agents with different agent parameters, each simulated scenario can cause the vehicle to violate a different (or the same) rule. Based on the rule that a simulated scenario causes the vehicle to violate, the signal processing system can assign a particular scenario score to the simulated scenario. The signal processing system can compare the scenario scores for each of the simulated scenarios to identify a simulated scenario that causes the vehicle to violate a highest priority rule as compared to the hierarchical plurality of rules. Based on the identified simulated scenario, the signal processing system can generate a test and/or train the control system of the vehicle. As a non-limiting example, the signal processing system tests the control system of the vehicle to identify adjustments to the control strategy of the vehicle.

By virtue of the implementation of systems, methods, and computer program products described herein, a system can generate the test for the control system of the vehicle. The control system of the vehicle can implement the test using a trained neural network of the control system of the vehicle. Based on implementation of the test, the trained neural network can identify a trajectory of the vehicle for the particular simulated scenario. For example, the trained neural network can identify how the vehicle reacts (e.g., what trajectory the vehicle implements) in a simulated scenario where a given trajectory (e.g., a base or test trajectory) causes the vehicle to violate a high priority rule, according to a hierarchical plurality of rules, as compared to rules that other simulated scenarios cause the vehicle to violate. Therefore, the system can more accurately generate simulated scenarios that cause the vehicle to violate a higher priority rule based on a transparent priority structure of the rules. Based on the generated simulated scenario, the system can more accurately and efficiently perform automated vehicle testing in order to improve automated vehicle driving behavior. In some cases, the system can more efficiently test a control system to determine how the control system reacts to edge cases by identifying particular parameters for an environment for the test case and avoiding parameters that may not cause a violation of the rules or may have been previously tested. By generating the simulated scenarios, the control system can identify simulated scenarios that cause a violation of higher priority rules to enable the system to more effectively train and test the control system prior to deployment. Such a training process can improve the quality and performance of the vehicle.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
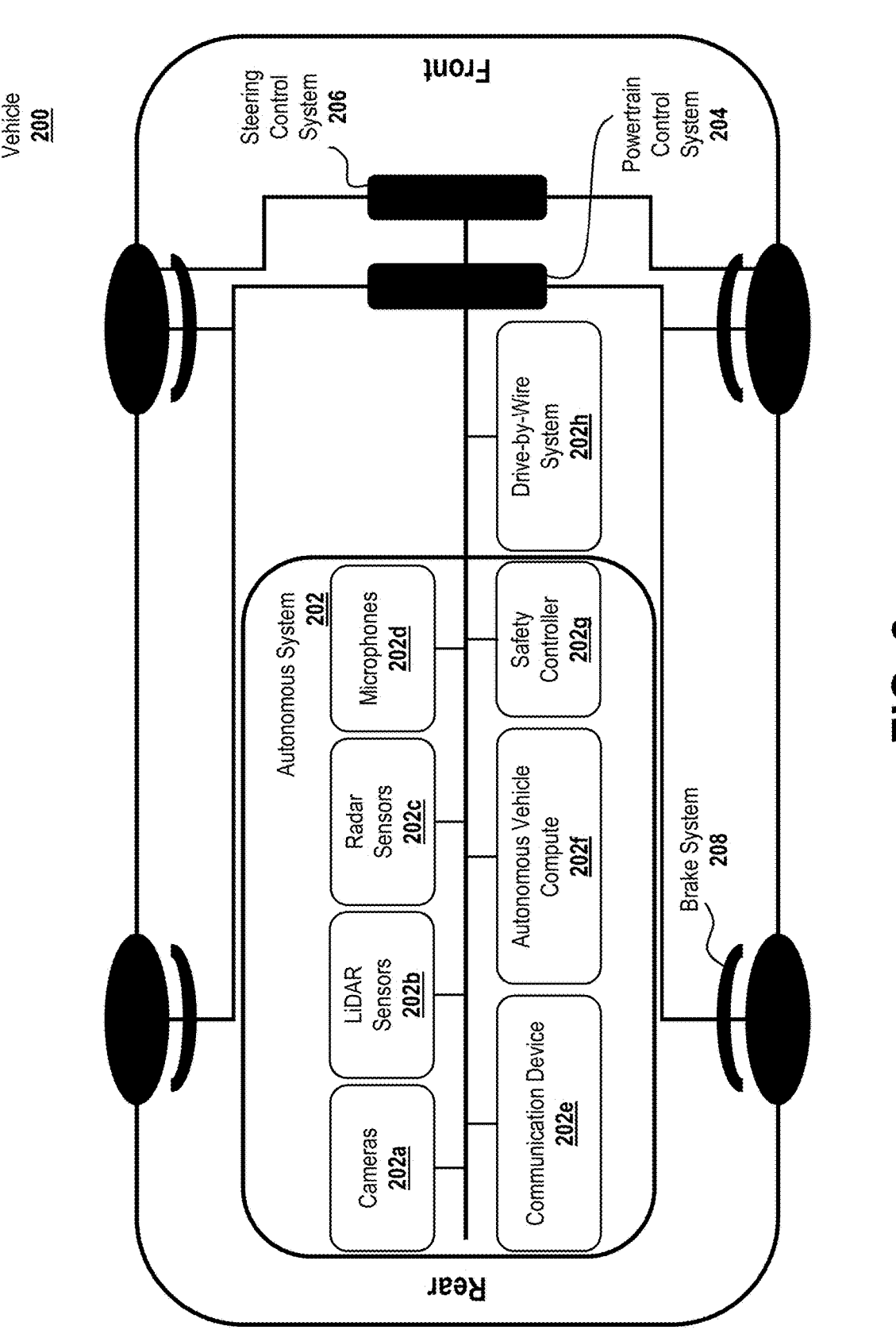
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
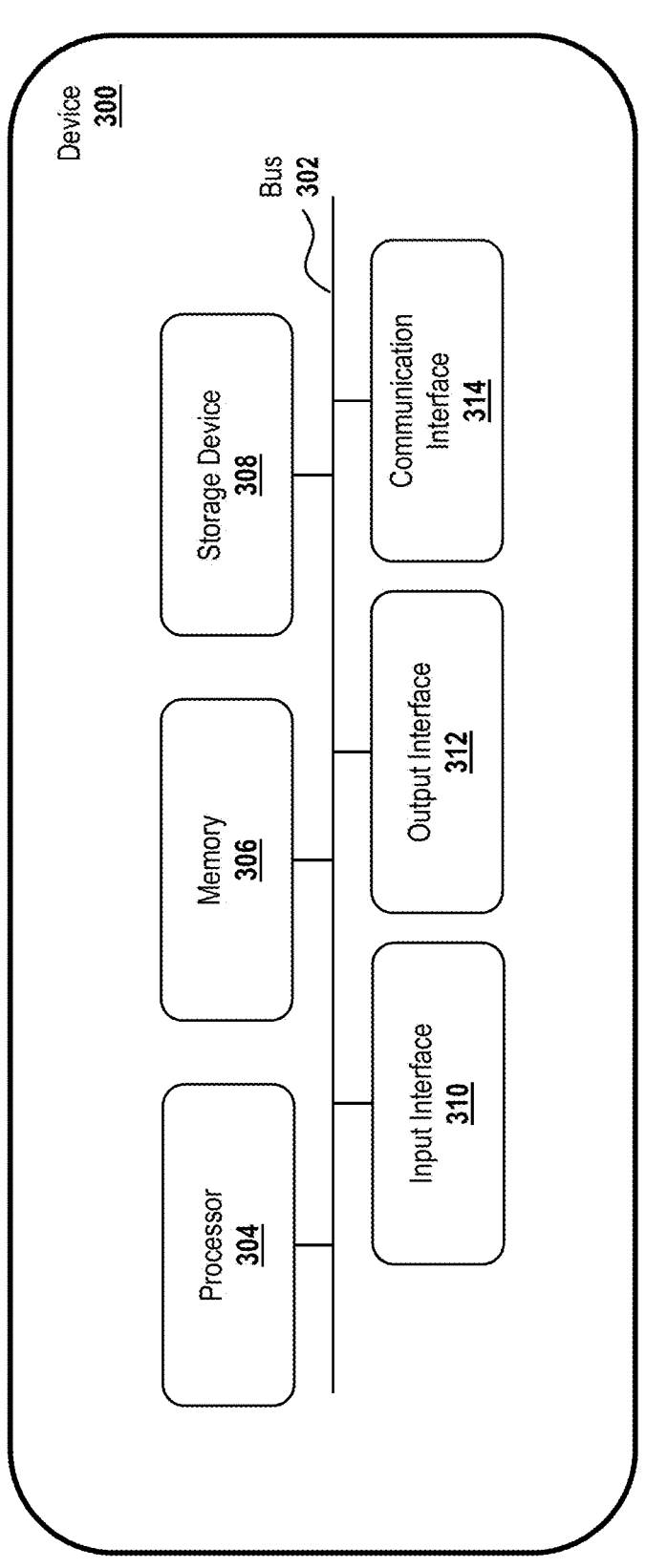
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum. In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* include at least one device configured to be in communication with cameras 202*a*, LiDAR sensors 202*b*, radar sensors 202*c*, microphones 202*d*, autonomous vehicle compute 202*f*, safety controller 202*g*, and/or DBW system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102) and/or one or more devices of network 112 (e.g., one or more devices of a system of network 112). In some embodiments, one or more devices of vehicles 102 (e.g., one or more devices of a system of vehicles 102) and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
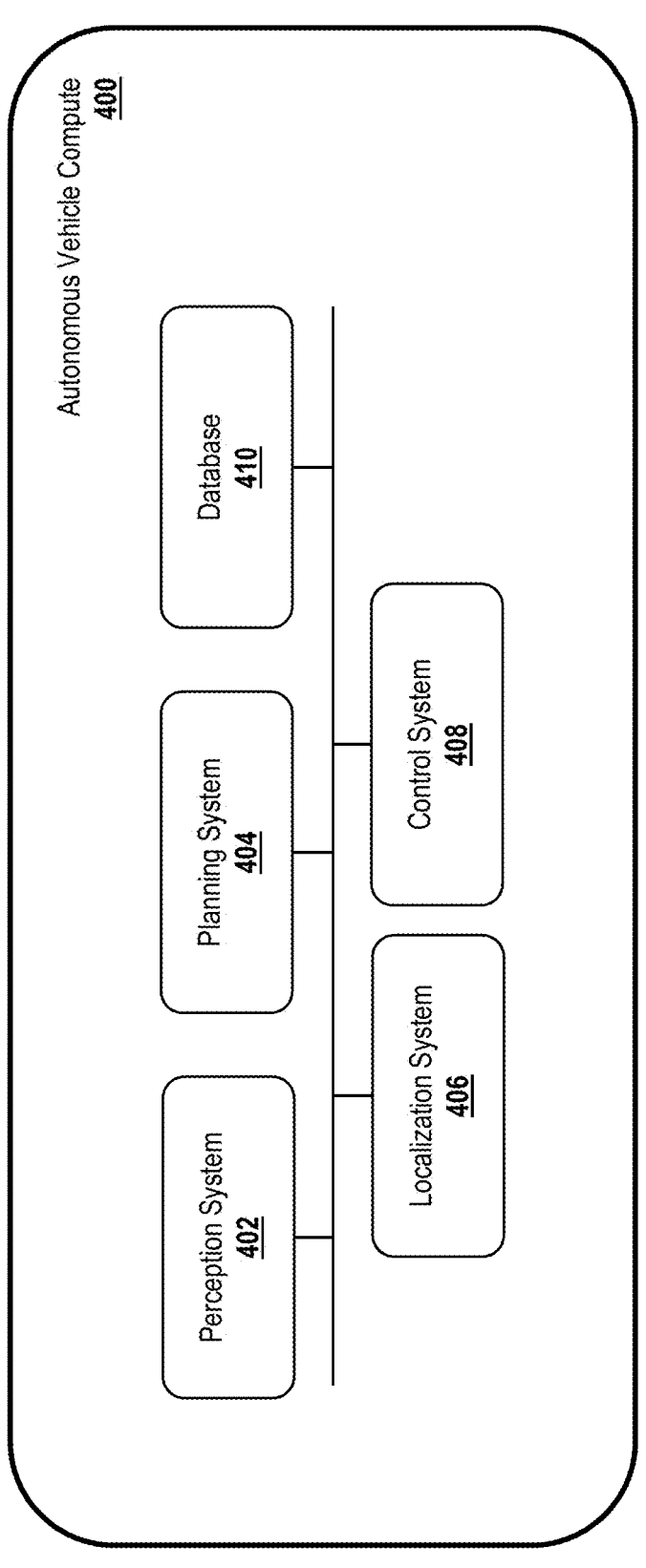
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
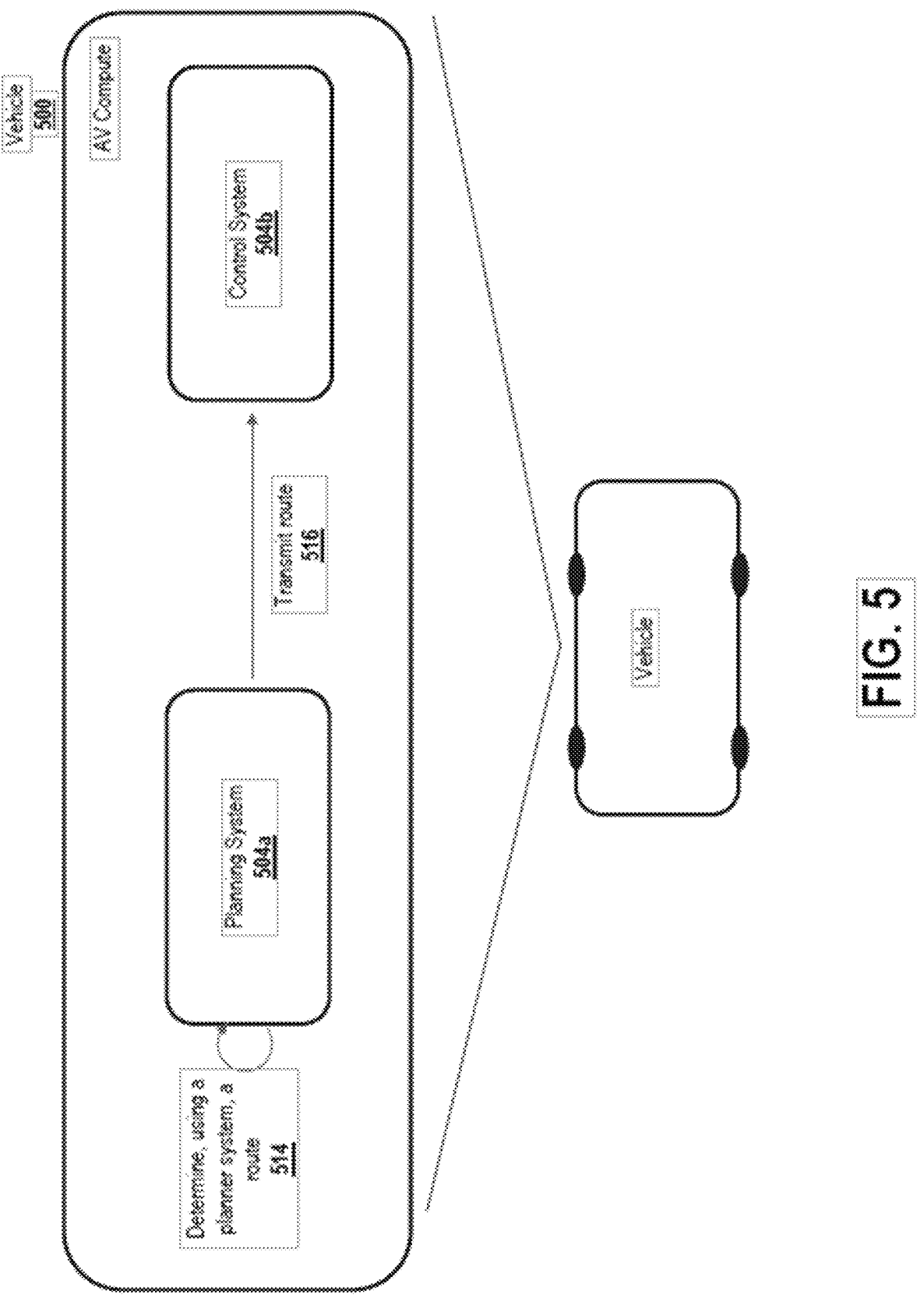
FIG. 5 are diagrams of an implementation of a process for graph exploration for trajectory generation based on a hierarchical plurality of rules.

Referring now to FIG. 5, illustrated is a diagram of an implementation 500 of a process for graph exploration for trajectory generation based on a hierarchical plurality of rules. In some embodiments, implementation 500 includes planning system 504a. In some embodiments, planning system 504a is the same as or similar to planning system 404 of FIG. 4. The output of a planning system 504a can be a route from a start point (e.g., source location or initial location) to an end point (e.g., destination or final location). In the example of FIG. 5, the planning system 504a determines the route at reference number 514 and transmits the route at reference number 516 to a control system 504b. During vehicle operation, the control system operates the vehicle to navigate the route. In some embodiments, the route and other AV compute data is stored for after-the fact evaluation of routes selected by the AV to navigate from a start point to an end point. Generally, the route is defined by one or more segments. For example, a segment is a distance to be traveled over at least a portion of a street, road, highway, driveway, or other physical area appropriate for automobile travel. In some examples, e.g., if the AV is an off-road capable vehicle such as a four-wheel-drive (4WD)

or all-wheel-drive (AWD) car, SUV, pick-up truck, or the like, the route includes "off-road" segments such as unpaved paths or open fields.

The planning system 504a can output lane-level route planning data (in addition to or instead of the route). The lane-level route planning data can be used to traverse segments of the route based on conditions of a particular segment at a particular time. In some embodiments, the lane-level route planning data is stored for after-the-fact evaluation using graph exploration as described herein. During operation, the lane-level route planning data can be used to traverse segments of the route based on conditions of the particular segment at a particular time. For example, if the route includes a multi-lane highway, the lane-level route planning data includes trajectory planning data that the AV can use to choose a lane among the multiple lanes (e.g., based on whether an exit is approaching, whether one or more of the lanes have other vehicles, or other factors that vary over the course of a few minutes or less as the vehicle moves along a route). Similarly, in some implementations, the lane-level route planning data includes speed constraints specific to a segment of the route. For example, if the segment includes pedestrians or un-expected traffic, the speed constraints may limit the AV to a travel speed slower than an expected speed, e.g., a speed based on speed limit data for the segment.

Figure 6:
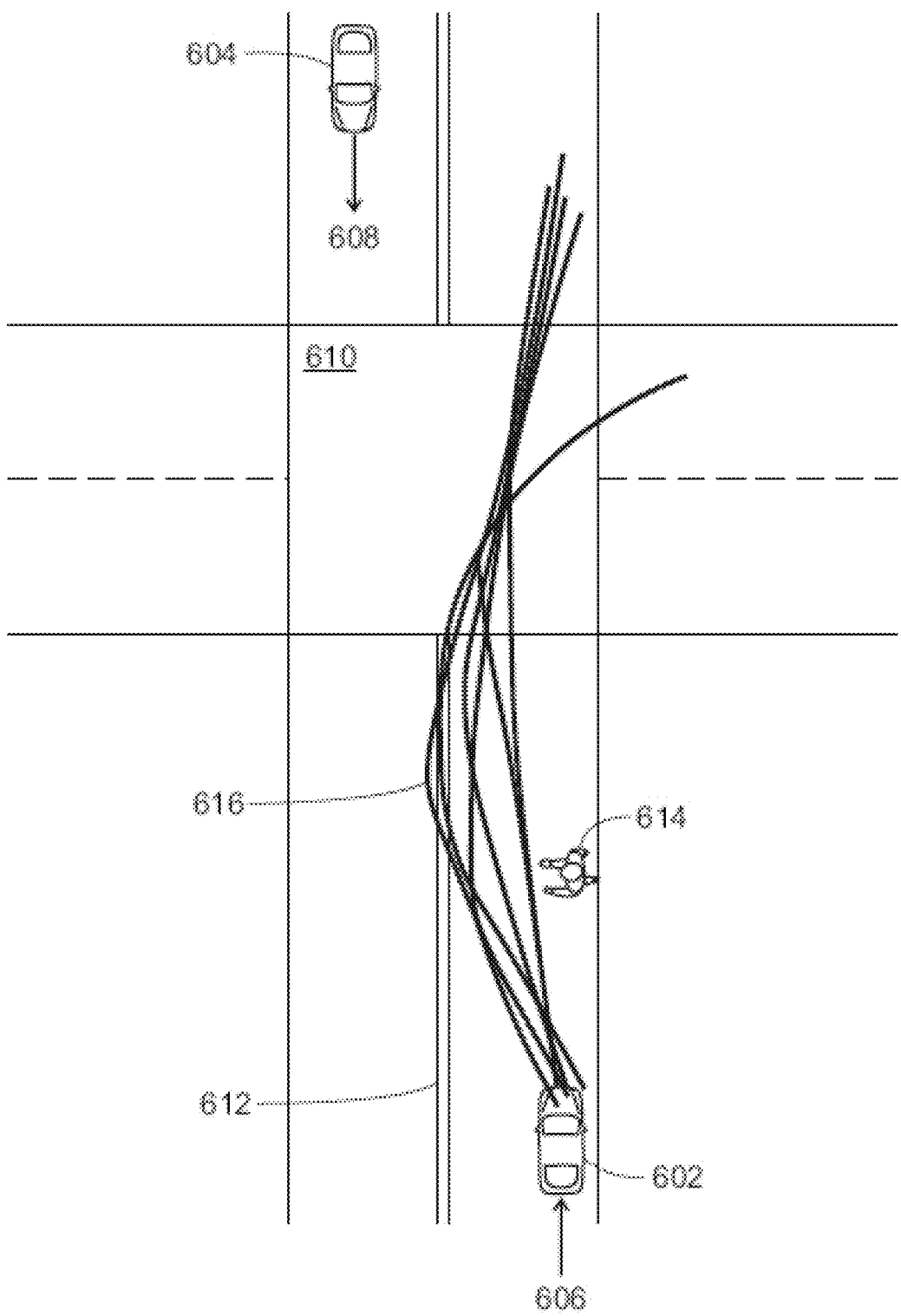
FIG. 6 illustrates an example scenario for autonomous vehicle operation using graph exploration with behavioral rule checks.

FIG. 6 illustrates an example scenario for AV 602 operation using graph exploration with behavioral rule checks, in accordance with one or more embodiments. The AV 602 may be, for example a vehicle 102 as illustrated and described in more detail with reference to FIG. 1 or a vehicle 200 as illustrated and described in more detail with reference to FIG. 2. The AV 602 operates in an environment 600, which may be an environment 100 as illustrated and described in more detail with reference to FIG. 1. In the example scenario illustrated in FIG. 6, the AV 602 is operating in lane 606 on approach to the intersection 610. Similarly, another vehicle 604 is operating in lane 608 on approach to the intersection 610. The flow of traffic in lane 606 is opposite to the flow of traffic in lane 608, as indicated by the arrows. There is a double line 612 separating lane 606 from lane 608. However, there is no physical road divider or median separating lane 606 from lane 608. The traffic rules in the environment 600 prohibit a vehicle from crossing the double line 612 or exceeding a predetermined speed limit (e.g., 45 miles per hour) in accordance with generally understood rules of the road.

The AV 602 is operating in the lane 606 to navigate to a destination beyond the intersection 610. As illustrated, a pedestrian 614 is located in the lane 606, blocking the lane 606. Other objects can block the AV's planned trajectory, such as incidents that block a lane of travel, vehicle breakdowns, construction, cyclists, and the like. In some embodiments, the AV 602 uses a perception system 402 to identify the objects, such as the pedestrian 614. The perception system 402 is illustrated and described in more detail with reference to FIG. 4. Generally, the perception system 402 classifies objects into types such as automobile, roadblock, traffic cones, etc. The classifications are provided to the planning system 404. The planning system 404 is illustrated and described in more detail with reference to FIG. 4.

The AV 602 determines that the lane 606 is blocked by the pedestrian 614. In examples, the AV 602 detects the boundaries of the pedestrian 614 based on characteristics of data points (e.g., sensor data) detected by the sensors 202 of FIG. 2. To reach the destination, a planning system 404 (FIG. 4) of the AV 602 generates the trajectories 616. Operating the AV 602 in accordance with one or more of the trajectories 616 causes the AV 602 to violate a traffic rule and cross the double line 612 to maneuver around the pedestrian 614 so that the AV 602 reaches its destination. Some of the trajectories 616 cause the AV 602 to cross the double line 612 and enter lane 608, in the path of the vehicle 604. The AV 602 uses a hierarchical plurality of rules (e.g., a hierarchical set of rules of operation) to provide feedback on the driving performance of AV 602. The hierarchical plurality of rules is sometimes referred to as a stored behavioral model or a rulebook. In some embodiments, the feedback is provided in a pass-fail manner. The embodiments disclosed herein detect when the AV 602 (e.g., the planning system 404 of FIG. 4) generates trajectories 616 that violate rules (e.g., behavioral rules), and determines whether the AV 602 could have generated an alternative trajectory that would have violated one or more lower-priority behavioral rules (e.g., behavioral rules with a lower priority than the trajectories 616 based on the hierarchical plurality of rules). The occurrence of such a detection denotes a failure of the motion planning process. The present techniques use graph exploration to heuristically determine a trajectory from the trajectories 616 that navigate past the pedestrian 614 in lane 606 and reaches a destination (e.g., goal). In some embodiments, the trajectory is a trajectory that begins at a starting pose and violates the behavioral rule with the lowest priority as compared to the priority of behavioral rules violated by other trajectories of the trajectories 616.

In some embodiments, at least one processor receives sensor data after the operation of the AV. The sensor data is representative of scenarios encountered by the AV while navigating through the environment. Hierarchical rules of the hierarchical plurality of rules are applied to scenarios simulated by an AV stack to modify and improve the AV development after-the-fact (e.g., after operation of the AV, where sensor data is captured). In examples, this offline framework is configured to develop a transparent and reproducible rule-based pass/fail evaluation of AV trajectories in test scenarios. For example, in an offline framework, a given trajectory output by the planning system 404 is rejected if a trajectory that leads to a lesser violation of the rule priority structure (e.g., a rule with a lower priority as compared to the priority of the rule violated by the trajectory) is found. The planning system is modified and improved based on, at least in part, the rejected trajectory and data associated with the rejected trajectory. In some embodiments, the present techniques receive a fixed set of trajectories generated after-the-fact from a given scenario and determines a particular trajectory to evaluate if the AV passes or fails a predetermined test. The present techniques use a set of fixed trajectories to create a graph. In some embodiments, the graph is an edge weighted graph and weights are assigned to edges that correspond to trajectories based on rule violations. Each trajectory can be associated with one or more costs, each cost corresponding to a rule violation. Determining the fixed set of trajectories is described with respect to FIG. 7.

Figure 7:
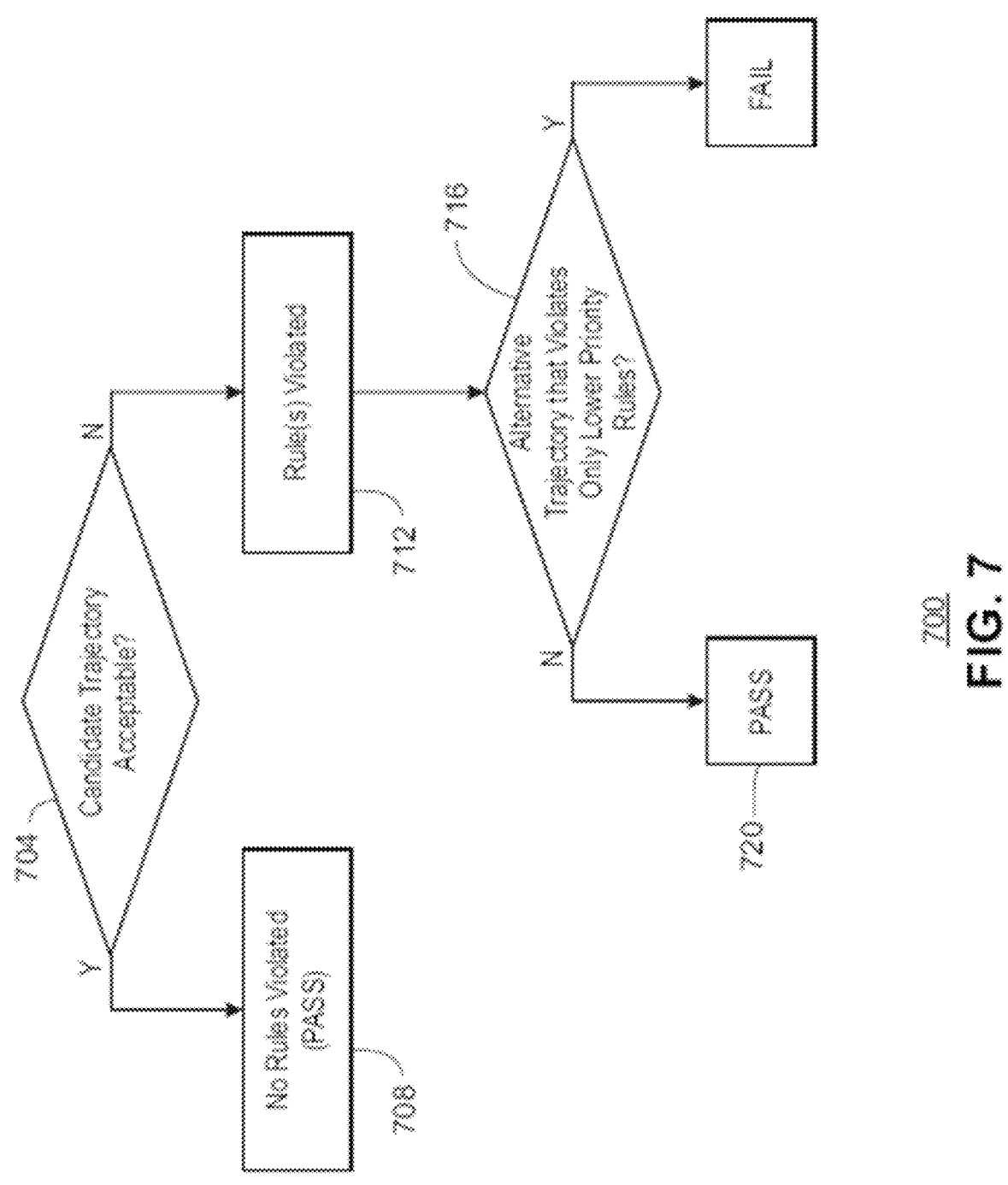
FIG. 7 illustrates an example flow diagram of a process for vehicle operation using behavioral rule checks to determine a fixed set of trajectories.

FIG. 7 illustrates an example flow diagram of a process 700 for vehicle operation using behavioral rule checks to determine a fixed set of trajectories. In some embodiments, the process of FIG. 7 is performed by the AV 200 of FIG. 2, the device 300 of FIG. 3, the AV compute 400 of FIG. 4, or any combinations thereof. In some embodiments, at least one processor located remotely from a vehicle performs the process 700 of FIG. 7. Likewise, embodiments may include different and/or additional steps, or perform the steps in different orders.

At block 704, it is determined that a trajectory (e.g., trajectories 616) for the AV 602 is acceptable (e.g., whether the trajectory violates a rule of the hierarchical plurality of rules). The trajectories 616 and AV 602 are illustrated and described in more detail with reference to FIG. 600. In some examples, a trajectory is determined to be acceptable based on the hierarchical plurality of rules. If no rules are violated by the trajectory, the trajectory is acceptable and the process moves to step 708 and the planning system 404 and AV behavior pass the verification checks. The planning system 404 is illustrated and described in more detail with reference to FIG. 4.

If a rule is violated by the trajectory, the process moves to block 712 to determine the rule(s) violated by the trajectory. The violated rule is denoted as a first behavioral rule having a first priority. The process moves to block 716. At block 716, the processor determines whether an alternative trajectory is available for the AV 602 that violates a behavioral rule with a lower priority than the first priority. For example, the processor generates multiple alternative trajectories for the AV 602 based on sensor data associated with a scenario. In some embodiments, the sensor data characterizes information associated with the AV, information associated with the objects, information associated with the environment, or any combinations thereof. The processor identifies whether a second trajectory from the multiple alternative trajectories is available that violates a second behavioral rule of the hierarchical plurality of rules with a second priority that is less than the first priority (e.g., the second trajectory does not violate a behavioral rule with a priority that is greater than or equal to the first priority). In some examples, if no other trajectory is available that violates (e.g., only violates) a second behavioral rule with a priority lower than the first priority, the process moves to block 720 and the planning system 404 passes the verification checks. At block 716, if an alternative trajectory is available for the AV 602 that violates a behavioral rule with a lower priority than the first priority, the planning system 404 fails the verification checks. Thus, the planning system 404 can identify a trajectory for a vehicle that violates a rule with a particular priority in order to avoid violating a rule with a higher comparative priority (e.g., a worse scenario).

In some examples, an AV is operable according to a hierarchical plurality of rules. Each behavioral rule has a priority with respect to each other rule. For example, a hierarchical plurality of rules (e.g., a rulebook) can include the following rules, in increasing order of priority: 1: maintain a predetermined speed limit; 2: stay in lane; 3: maintain a predetermined clearance; 4: reach goal; 5: avoid collisions. In some examples, the priority represents a risk level of a violation of the behavioral rules. The hierarchical plurality of rules may, in some cases, be implemented as a formal framework to specify driving requirements enforced by traffic laws, cultural expectations, safety considerations, driving norms, etc. as well as their relative priorities. In certain cases, the hierarchical plurality of rules may be implemented as a pre-ordered set of rules having violation priorities (e.g., scores) that capture the hierarchy of the rule priorities. Hence, the hierarchical plurality of rules enables AV behavior specification and assessment in conflicting scenarios.

Referring again to FIG. 6, consider the case where a pedestrian 614 enters the lane in which the AV 602 is traveling. The hierarchical plurality of rules may indicate that the highest priority of the AV 602 is to avoid collision with the pedestrian 614 and other vehicle 604 (e.g., satisfy rule 5: avoid collision, highest priority in the exemplary hierarchical plurality of rules) at the cost of violating lower priority rules, such as reducing speed to less than a minimum speed limit (e.g., violation of rule 1: maintain a predetermined speed limit) or deviating from a lane (e.g. violation of rule 2: stay in lane). For example, generation of the hierarchical plurality of rules may be an after-the-fact prioritization of actions the AV should take based on perfect information (e.g., knowing predetermined values or states) associated with the scenario.

In some cases, the AV may determine a trajectory of the AV that causes a violation of a behavioral rule such that the AV exceeds a predetermined speed limit (e.g., 45 mph). For example, the rule (1) may be to maintain a predetermined speed limit, denoting that the AV should not violate the speed limit of the lane it is traveling in. In the aforementioned example, the priority of rule (1) is lower than the priority of rule (5): avoid collisions, rule (4): reach goal, rule (3): maintain clearance, and/or rule (2): stay in lane. Thus, the AV may violate rule (1) to avoid violating rules (2), (3), (4) and/or (5).

In an embodiment, the AV may determine a trajectory of the AV that causes a violation of a behavioral rule such that the AV stops before reaching a destination. In examples, rule (2) may be to stay in lane, denoting that the AV should stay in its own lane. The priority of rule (2) is lower than the priority of rule (5): avoid collisions, rule (4): reach goal, and/or rule (3): maintain clearance. Thus, the AV may violate rule (1) or rule (2) to avoid violating rules (3), (4), and/or (5).

In an embodiment, the AV may determine a trajectory of the AV that causes a violation of a behavioral rule such that a lateral clearance between the AV and the objects near the AV decreases below a threshold lateral distance. For example, rule (3) may be to maintain a predetermined clearance, denoting that the AV should maintain a threshold lateral distance (e.g., one half car length or 1 meter) from any other object (e.g., pedestrian 614). The priority of rule 3 is lower than the priority of rule (5): avoid collisions, and/or rule (4): reach goal, and the AV can violate rules (1), (2), or (3) to avoid violating rules (4) and/or (5).

In some embodiments, the sets of alternative trajectories are generated based on driver and/or driving behavior. For example, the trajectories may include trajectories generated based on driver behavior (e.g., human driver behavior), trajectories generated based on driving behavior (e.g., trajectories generated by a model), training trajectories, or any other trajectories. The trajectories may be grouped into a plurality of trajectory sets, and can be stitched together to generate a graph of trajectories. In some embodiments, the trajectory sets may represent some or all of the trajectories the AV can take with respect to a starting pose (e.g., location, speed, heading, and/or acceleration). Accordingly, the trajectories may include paths that are possible in view of a pose.

Figure 8:
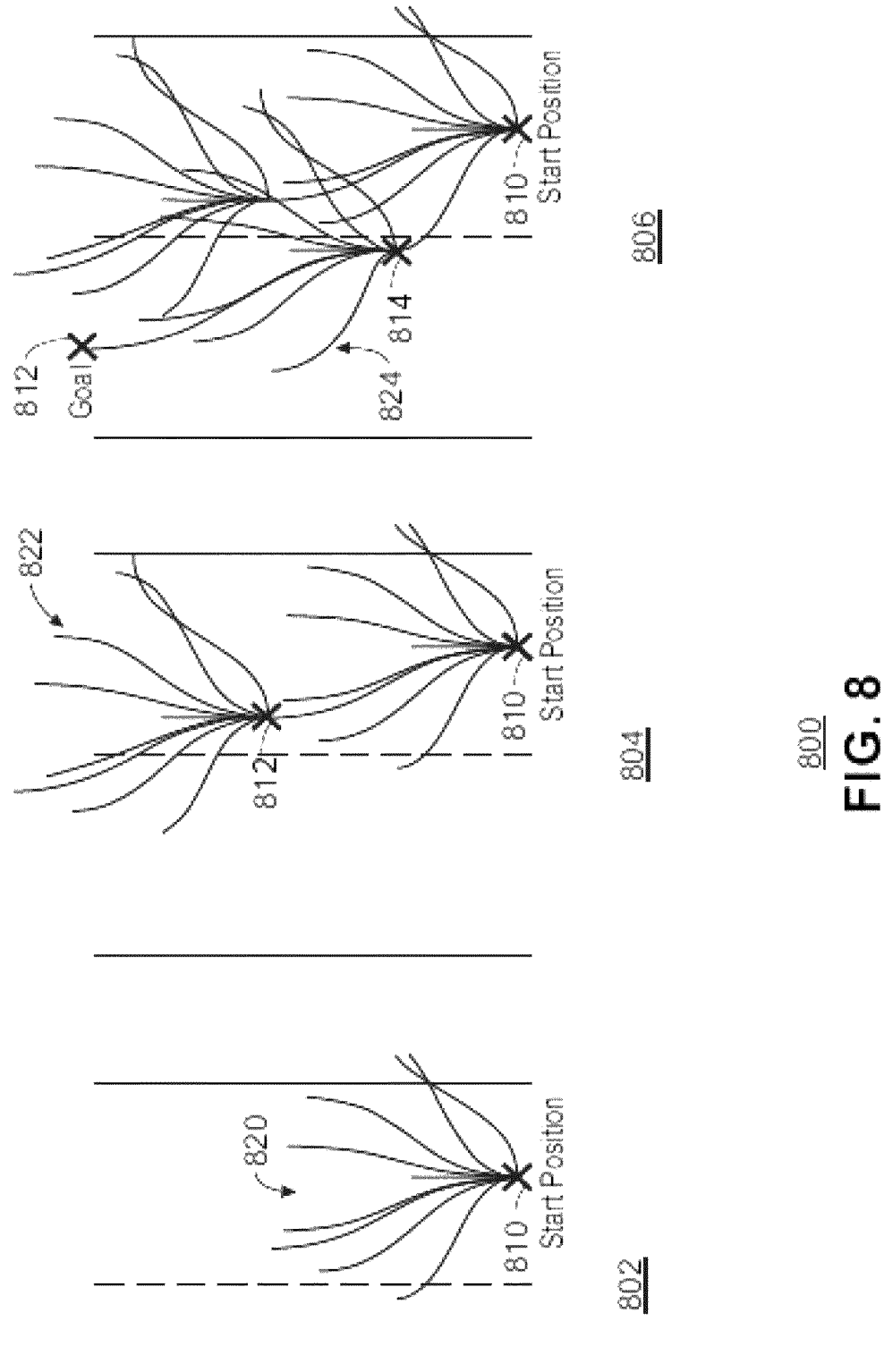
FIG. 8 is an illustration of iteratively growing graphs to find a trajectory after-the-fact.

FIG. 8 is an illustration of iteratively growing graphs 800 to determine a trajectory that violates a rule with a lowest priority (and/or violates no rules) as compared to rules violated by other trajectories after-the-fact. In some embodiments, the generated graphs 802, 804, and 806 are explored to determine a trajectory that represents a preferred path for the vehicle to take through an environment. The preferred path can be used to compare a trajectory taken by the AV in a same scenario associated with the determined trajectories according to the present techniques. The graph generation enables evaluation of an AV response in view of a determined trajectory.

In some embodiments, a preferred trajectory changes over time or based on different locations. Put another way, a preferred trajectory at a first pose might cause a violation of higher priority rules at subsequent poses. For example, during travel through an environment, based on a preferred trajectory at a first pose, the AV can get stuck (e.g., unable to plan a path forward) or left to follow a path that creates a particular rule violation.

In some cases, trajectories are generated without positive reinforcement of selected (e.g., traversed or navigated) trajectories as the AV travels. In traditional techniques, generated trajectories can deteriorate over time. The present techniques evaluate candidate trajectories at a series of poses, such that a subset of the trajectories at a series of poses are selected according to the hierarchical plurality of rules. The trajectories are iteratively traversed to generate a graph of trajectories from a starting pose to a goal pose. The present techniques create a graph based on the fixed set of trajectories. In some embodiments, the generated graph captures vehicular dynamics from the fixed trajectory sets using the series of poses.

In the example of FIG. 8, a first pose 810 of the AV is at the start position. From the start position, a set of alternative trajectories 820 for a vehicle at a first pose 810 (e.g., root node of the corresponding graph) are generated, the set of alternative trajectories representing operation of the vehicle from the first pose 810. In the set of alternative trajectories, one or more trajectories are determined (e.g., trajectories that cause a violation of rules from the hierarchical plurality of rules with a priority lower than the priority of rules violated by other trajectories from the set of alternative trajectories 820). The determined trajectories are used to determine next poses, and a next set of alternative trajectories 822 and 824 are generated from the next poses. In particular, a next pose 812 is evaluated to generate a next set of alternative trajectories 822. A next pose 814 is evaluated to generate a next set of alternative trajectories 824. In some embodiments, sets of alternative trajectories are iteratively generated until the goal/destination is reached.

As illustrated in FIG. 8, the graphs 802, 804, and 806 are generated by calculating a set of alternative trajectories 820 at a first pose 810 in a given scenario. From the set of alternative trajectories 820, the one or more trajectories (e.g., a random or pseudo-random subset of the set of alternative trajectories 820) are determined. In some examples, one or more trajectories are selected based on causing a violation of rules of the hierarchical plurality of rules with the lowest (or lower) priority as compared to rule violations of other trajectories of the set of alternative trajectories 820. For example, a preordered list of priorities according to the rule violations can be associated with each trajectory of the graph. An example of this priority is described below with respect to FIG. 9. Generally, the numbers of trajectories selected for each set of trajectories (e.g., each layer of graph growing) enables tuning of the quality of the graph as compared to the speed of computing the graph. A larger number of trajectories can cause exponential increases in computation time, however the quality of the resulting graph also increases.

In some embodiments, the set of alternative trajectories 820 is grown with the next set of alternative trajectories 822, 824. For example, a next pose (e.g., next pose 812, 814) at the end of a selected trajectory of the set of alternative trajectories 820 is used to iteratively generate a next (e.g., random) set of alternative trajectories (e.g., the next set of alternative trajectories 822, 824). The trajectories that are retained from the next set of alternative trajectories can be trajectories that cause a violation of rules from the hierarchical plurality of rules with a priority lower than the priority of rules violated by other trajectories from the next set of alternative trajectories. Graph growth can continue until one or more trajectories are generated that reach the goal or a timeout occurs. The timeout may be a predetermined period of time before graph generation is terminated. In some examples, the timeout can be canceled or overridden to continue graph generation. The trajectories (e.g., the path) selected for the graph can be those trajectories from the first pose to the goal that have a lowest priority according to the hierarchical plurality of rules.

Figure 9:
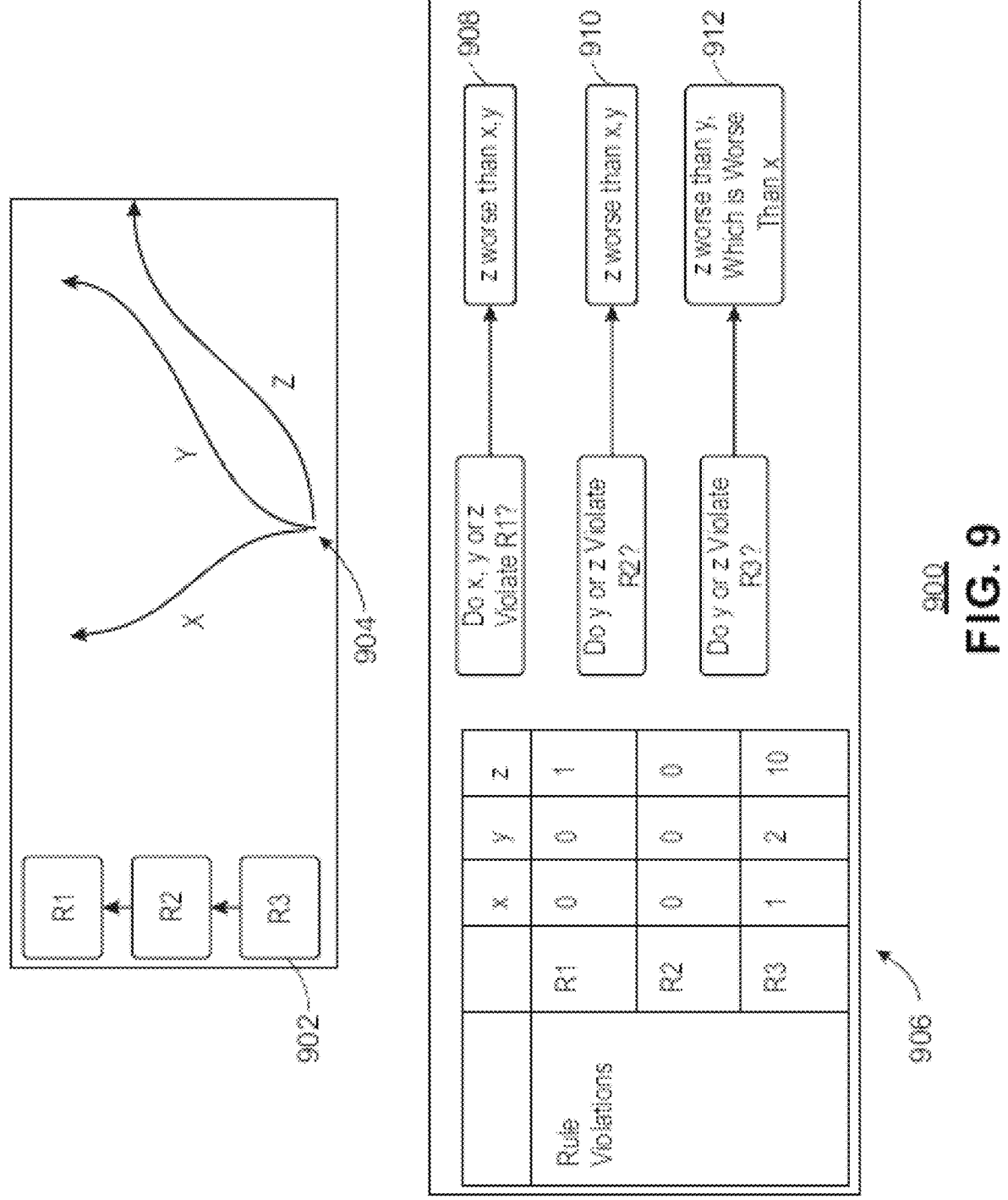
FIG. 9 is a diagram of system that calculates priorities according to a hierarchical plurality of rules.

FIG. 9 is a diagram of system 900 that calculates a priority (e.g., a score) for all or a portion of trajectories according to a hierarchical plurality of rules. A path can include multiple trajectories and the system 900 can calculate a priority of the path based on a highest priority of a trajectory of the path as compared to other trajectories of the path, a cumulative priority of the priorities of all or a portion of the trajectories of the path, etc. In the example of FIG. 9, a hierarchical plurality of rules 902 provides three exemplary hierarchical rules: R1 (highest priority), R2 (next highest priority), R3 (lowest priority). The system 900 can assign all or a portion of the hierarchical rules a base priority based on the hierarchical plurality of rules 902. The system 900 can further determine a priority of a violation of a rule by a trajectory based on the base priority and a level of a violation of the rule. For example, the hierarchical plurality of rules 902 indicates that a violation of rule R1 has a priority of 1 and the system 900 determines that a singular violation of rule R1, a lesser violation of rule R1 (as compared to other violations), etc. has a priority of 1 and multiple violations of rule R1, a greater violation of rule R1 (as compared to other violations), etc. has a priority of 2. Additionally, a fixed set of trajectories 904 includes a trajectory x, trajectory y, and trajectory z. The fixed set of trajectories may be the same as or similar to the trajectories 616 (FIG. 6) or trajectories 820, 822, or 824 of FIG. 8. In some embodiments, the fixed set of trajectories represent all or a portion of the actions that vehicles can make in traffic situations. In some examples, the fixed set of trajectories is generated using a planning system of an AV (e.g., planning system 404 of FIG. 4) in response to simulation in a predetermined scenario. In examples, the predetermined scenario is represented by AV compute inputs and outputs as the AV travels from a starting pose toward a destination.

In some embodiments, the priority represents a comparative level of a rule violation as compared to the level of rule violation by one or more other trajectories. For example, each individual rule is independently evaluated and compared to all or a portion of the other trajectories. The priority can be based on, at least in part, the particular rule. For example, for a rule associated with a minimum clearance between the AV and a pedestrian, the priority is based on the number of violations (e.g., instantaneous violations) of clearance associated with the AV and one or more pedestrians, the distance between the AV and a pedestrian, etc. In this example, the violations are entering a space near the pedestrian by violating a clearance between the AV and the pedestrian. Each trajectory can be ranked based on the number of violations, the type of violations, the magnitude of violations, etc. according to a lexicographic order.

In the example of FIG. 9, system 900 identifies rule violations caused by all or a portion of the fixed set of trajectories to determine rule violation priorities 906 for each trajectory. In particular, the system 900 evaluates all or a portion of the rules to determine the rule violation priorities for a trajectory. At evaluation 908, the system 900 evaluates rule R1 to determine if trajectory x, trajectory y, or trajectory Z violates rule R1. In the example of FIG. 9, the system 900 determines that trajectory z violates rule R1, while trajectory x and trajectory y do not violate rule R1. The system 900 assigns trajectory z a priority of 1 with respect to rule R1. The system 900 assigns trajectories x and y a priority of 0 with respect to rule R1. At evaluation 910, the system 900 evaluates rule R2 to determine if trajectory x, trajectory y, or trajectory Z violates rule R2. In the example of FIG. 9, no trajectory violates rule R2. The system 900 assigns each trajectory a priority 0 with respect to rule R2. At evaluation 908 trajectory z is the only trajectory that violates R1, so the system 900 assigns a priority for violation of rule R1 to trajectory z. At evaluation 902, no trajectory violates rule R2 so the system 900 does not assign a priority for violation of rule R2 to any of the trajectories (or assigns a priority of 0).

At evaluation 912, the system 900 evaluates rule R3 to determine if trajectory x, trajectory y, or trajectory z violates rule R3. In the example of FIG. 9, the system 900 determines trajectory z violates rule R3 worse than trajectory y violates rule R3, which in turn violates rule R3 worse than trajectory x. violates rule R3 The system 900 assigns trajectory z a priority of 10 with respect to rule R3, where 10 is the maximum number of violations of rule R3. The system 900 assigns trajectory x a priority of 1, and trajectory y a priority of 2 with respect to rule R3.

In some examples, from a set of fixed trajectories, the system 900 can determine a random subset of the trajectories. The determined trajectories can be the trajectories that have a priority above a predetermined threshold with respect to all or a portion of the rules. In some examples, the system 900 can select all or a portion of the trajectories that have a priority above the predetermined threshold according to the hierarchical plurality of rules for the graph. In some embodiments, the system 900 generates a second set of trajectories from poses located at the end of the determined trajectories (e.g., the system grows the determined trajectories). Graph growth can continue until one or more paths of trajectories are generated that reach the goal pose. The system 900 can select a path for the graph from the first pose to the goal pose that has a lowest priority (e.g., cumulative or total priority) as compared to other paths that reach the goal pose according to the hierarchical plurality of rules. In this manner, the system 900 can generate the graph as a guided heuristic using the behavior modeling and prediction data set. In some examples, the present techniques do not converge on a singular trajectory or path. For example, the system 900 can obtain multiple trajectories or paths with a particular priority.

Referring now to FIG. 10, illustrated is a flowchart of a process 1000 for graph exploration for trajectory generation based on a hierarchical plurality of rules. In some embodiments, one or more of the steps described with respect to process 1000 are performed (e.g., completely, partially, and/or the like) by autonomous vehicle 200 of FIG. 2 or AV computer 400 of FIG. 4. Additionally, or alternatively, in some embodiments one or more steps described with respect to process 1000 are performed (e.g., completely, partially, and/or the like) by another device or group of devices separate from or including autonomous system 400 such as device 300 of FIG. 3.

At block 1002, a set of alternative trajectories for a vehicle at a first pose are generated. In some embodiments, the alterative trajectories are sets of trajectories generated using behavior prediction. In some embodiments, the first pose is a root node of the corresponding graph. The set of alternative trajectories represent operation of the vehicle from the first pose.

At block 1004, a trajectory from the set of alternative trajectories is identified. In some embodiments, the trajectory violates a behavioral rule of a hierarchical plurality of rules with a priority less than a priority of behavioral rules violated by other trajectories in the set of alternative trajectories. Accordingly, in some embodiments, the present techniques select the one or more trajectories at the first node that cause a violation of a lowest priority rule as compared to violations of other rules by other trajectories.

At block 1006, a next set of alternative trajectories is generated from a next pose at the end of the trajectory responsive to identifying the trajectory. The next set of alternative trajectories represents operation of the vehicle from the next pose. In this manner, the graph is iteratively grown based on the next pose at the end of the identified trajectory. The next set of alternative trajectories for the vehicle may be generated from the next pose by applying vehicle dynamics associated with the next pose to possible trajectories associated with a location of the next pose. Vehicle dynamics include, for example, speed, location, acceleration, and orientation associated with the trajectory at the next pose.

At block 1008, next trajectories from corresponding next sets of alternative trajectories are iteratively identified. In some embodiments, a next trajectory violates a behavioral rule of the hierarchical plurality of rules with a priority less than a priority of behavioral rules violated by other trajectories in a corresponding next set of alternative trajectories until a goal pose is reached to generate a graph. Put another way, in some embodiments, the present techniques iteratively repeat steps of identifying a trajectory from a set of trajectories at a pose at the end of a previously identified trajectory until the goal pose is reached. In some embodiments the trajectory does not reach a goal pose, and the present techniques iteratively repeat steps of identifying a trajectory at the end of a previously identified trajectory until a predetermined timeout occurs. In some examples, the trajectory is the trajectory that violates the lowest priority behavioral rules as compared to other trajectories, where the trajectories are ranked according to rule violations in a hierarchical plurality of rules. Growing the graph generally continues until a path to the goal pose from the first pose is identified as described above. At block 1010, a vehicle is operated based on the graph. In examples, vehicle operation based on the graph includes extracting a path (e.g., one or more trajectories) from the graph and comparing a trajectory taken by a vehicle to the trajectories of the extracted path. In this manner, performance of the vehicle is evaluated in view of a determined trajectory. The trajectories of the path extracted from the graph can be used to provide feedback on vehicle performance.

Rulebook Scenario Generation for Control System Testing

A system can operate a vehicle to move along a route (e.g., from a first location to a second location). As the vehicle moves along the route, the vehicle can encounter a number of objects (e.g., pedestrians, other vehicles, traffic lights, traffic signs, road work, traffic, etc.). In response, the vehicle can generate one or more trajectories or paths around the objects. The system can define a route from a source to a destination based on the trajectory or path. For example, the route can be based on multiple paths or trajectories.

However, the generated trajectories or paths can violate one or more rules, such as but not limited to traffic laws, cultural expectations of driving behavior, a destination, etc. As discussed above, the rules can be grouped into a hierarchical plurality of rules that defines a priority of all or a portion of the rules.

As a path can cause a violation of a different rule with a different (e.g., lower) priority or may not cause a violation of rule, the system can select a path that causes a violation of a rule with the lowest priority or no violation of a rule. The operation of the vehicle according to a path that causes a violation of a higher priority rule when a path that causes a violation of lower priority rule is available can produce adverse effects, such as increasing the likelihood of a collision or causing discomfort to passengers.

To train the control system of a vehicle to identify a path that causes a lower priority rule violation when available, the system (or a separate system) can provide a simulated scenario to the control system of the vehicle. The simulated scenario can include a simulated environment. The simulated environment can include one or more environmental parameters and/or one or more simulated agents within the simulated environment. The simulated agents can be agents with agent parameters. The agent parameters can define particular actions to be performed by the agents. For example, the agents can perform actions in the simulated environment (e.g., driving a vehicle, walking, riding a bicycle, crossing a street, etc.). As the simulated environment (e.g., the environmental parameters, the number of agents, the type of agents, and/or the agent parameters of the agents) varies, the simulated scenario can also vary. Therefore, a plurality of simulated scenarios for the control system of the vehicle can be possible. Further, each combination of a particular set of simulated agents each with a particular set of agent parameters and a particular set of environmental parameters can be a particular simulated scenario. For example, the number of potential simulated scenarios can be large (e.g., over 100 simulated scenarios).

The system can provide a simulated trajectory and a particular rule (e.g., a safety rule) to the control system of the vehicle. The control system of the vehicle can simulate operation of the vehicle in the simulated scenario according to the simulated trajectory. Based on the simulated operation of the vehicle, the control system of the vehicle can determine if a control strategy of the control system of the vehicle causes a simulated vehicle to violate the particular rule. In some cases, the system provides a hierarchical plurality of rules to the control system of the vehicle to determine how the control system of the vehicle operates the simulated vehicle given the simulated scenario, the simulated trajectory, and the hierarchical plurality of rules.

The simulated trajectory may or may not cause a violation of a rule given the simulated scenario. Accordingly, the system may not train the control system to control a vehicle when a rule of the hierarchical plurality of rules is violated. For example, if the trajectory does not cause a violation of a rule of the hierarchical plurality of rules, the system may not train the control system to control the vehicle when a trajectory causes a violation of the rule. Therefore, systems can train the control system of the vehicle using a simulated scenario for the vehicle. The systems can cause operation of the vehicle based on training the control system of the vehicle.

Given the number of simulated scenarios that can be generated for the vehicle and can be used to test the control system, the system may not provide each simulated scenario to the control system of the vehicle for testing. Instead, the system can (e.g., randomly or non-randomly) identify and/or generate the simulated scenarios for the control system of the vehicle. However, identifying and/or generating the simulated scenarios for the control system of the vehicle in such a manner can limit the ability to test the control system. For example, the simulated scenarios can be standard environments that do not cause the control system to violate any rules. Further, the simulated scenarios may not include particular edge case scenarios that can cause or can be more likely to cause the control system to violate a higher priority rule. As such, while the system can generate simulated scenarios to determine how the control system can act with regard to standard environments, it may not test or determine how the control system can act with regard to non-standard environments.

As the system may not identify the simulated scenarios that cause a violation of a higher priority rule as compared to the hierarchical plurality of rules, the system may be unable to identify settings of the control system of the vehicle that cause the vehicle to violate a higher priority rule when a lower priority rule (as compared to the higher priority rule) could be violated. For instance, the settings of the control system of the vehicle can cause the vehicle to violate a high priority rule in a particular scenario when a lower priority rule could be violated instead. For example, a trajectory selected during a first planning step (e.g., T1.TA) can violate a rule with a higher priority (P4) than the priority of a rule (e.g., P5, P6, P7) violated by a different trajectory in the first planning step (e.g., T1.TB, T1.TC).

As discussed above, the system can generate simulated scenarios that do not cause a violation of a rule or cause a violation of a low priority rule as compared to the hierarchical plurality of rules. As the simulated scenarios may not cause a violation of a rule or can cause a violation of a low priority rule, the system may not identify scenarios where a lower priority rule could be violated. For example, a system can be more likely to identify a lower priority rule that can be violated in a particular simulated scenario that causes a violation of a rule with a high priority (P1) as compared to a simulated scenario that causes a violation of a rule with a low priority (P6).

Some systems utilize multiple simulated scenarios to train a control system of a vehicle. For example, the system can maintain a plurality of simulated scenarios and individually train the control system of the vehicle using each of the simulated scenarios. Such a maintaining and utilization of a multiple simulated scenarios to train the control system of the vehicle can be computationally inefficient. For example, as discussed above, the number of simulated scenarios can be large (e.g., over 100 simulated scenarios). As each control system of a plurality of control systems of a fleet of vehicles may be trained, the training of the control system of the vehicles can be extensive. Therefore, it may be computationally inefficient and intensive to maintain multiple simulated scenarios.

To address these issues, the remote AV system 114 (or a separate system) can identify simulated scenarios that are more likely to cause a vehicle to violate a higher priority rule as compared to other simulated scenarios. The remote AV system 114 can train and/or test the control system of the vehicle using the simulated scenarios that are more likely to cause a vehicle to violate a higher priority rule. By maintaining such simulated scenarios (instead of randomly generating the simulated scenarios), the remote AV system 114 can increase the likelihood that the control system of the vehicle causes the vehicle to violate a higher priority rule when a lower priority rule or no rule could be violated for a particular simulated scenario. By identifying simulated scenarios that cause the control system of the vehicle to violate rules with a higher priority rule when a lower priority rule could be violated, the remote AV system 114 can identify adjustments to the control strategy of the control system of the vehicle such that the lower priority rule is violated and not the higher priority rule. Further, by identifying particular simulated scenarios for testing the control system of the vehicle, the remote AV system 114 can reduce the computational intensity and/or complexity and increase the efficiency of the control system training process. Such a reduction in the computational intensity can reduce the cost associated with the control system training process as compared to some systems that test the control system of the vehicle using a plurality of simulated scenarios.

The remote AV system 114 can generate and/or identify simulated environments. The simulated environments can include and/or can be based on environmental parameter(s) and simulated agent(s). For example, the environmental parameters can include conditions associated with the environments such as a road size, presence of a sidewalk, size of the sidewalk, location of the sidewalk, road conditions (e.g., icy, potholes, etc.), etc. The simulated agents can include other vehicles, pedestrians, animals, bicycles, etc. In some cases, the simulated agents can have agent parameters. For example, the agent parameters can include a location of the simulated agent in the simulated environment, an action performed by the simulated agent, a type of the simulated agent, etc.

The remote AV system 114 can identify a trajectory of a vehicle within the simulated environment. For example, the trajectory of the vehicle can indicate from a first position to a second position in the simulated environment. In some cases, the trajectory of the vehicle can be based on observed vehicle data (e.g., a previous trajectory associated with the vehicle).

The remote AV system 114 can generate the simulated scenarios using simulated environments. To generate the simulated scenarios, the remote AV system 114 can modify agents parameters of the simulated agents of the simulated environments. Therefore, the remote AV system 114 can generate simulated scenarios that each include environmental parameters and simulated agents with different agent parameters. For example, a first simulated scenario can include a pedestrian walking along the side of the road, a second simulated scenario can include a pedestrian walking across the road, a third simulated scenario can include a pedestrian standing in the road, a fourth simulated scenario can include a pedestrian standing on a sidewalk, and a fifth simulated scenario may not include a pedestrian. In some cases, all or a portion of the simulated scenarios can include different environmental parameters, different simulated agents, and/or simulated agents with different agent parameters.

The remote AV system 114 can parametrize each of the simulated scenarios. For example, the remote AV system 114 can assign a scenario score to each simulated scenario. To identify the scenario score to be assigned to a particular simulated scenario, the remote AV system 114 can determine a trajectory for a simulated vehicle within the simulated scenario. For example, the trajectory can be a straight route from a first pose to a second pose. Based on the trajectory of the simulated vehicle within the simulated scenario, the remote AV system 114 can identify a rule that is violated when the simulated vehicle travels along the trajectory given the simulated scenario. The remote AV system 114 can utilize a hierarchical plurality of rules to determine each rule that the trajectory causes the simulated vehicle to violate. For example, the trajectory can cause the simulated vehicle to violate a first rule that prohibits collisions with another vehicle, a second rule that indicates a vehicle should drive in a drivable area, a third rule that prohibits exceeding a speed limit, a fourth rule that prohibits a vehicle from approaching a particular distance of another vehicle, a fifth rule that prohibits a vehicle from entering a lane of traffic that is flowing in a direction that is oriented differently from a direction of the trajectory, and/or a sixth rule that indicates a vehicle should drive comfortably.

The remote AV system 114 can identify a highest priority rule that the trajectory causes the vehicle to violate from the rules that trajectory causes the vehicle to violate. For example, the remote AV system 114 can identify that a trajectory causes a vehicle to violate a first rule that prohibits collisions with another vehicle that has a first priority (P1) and a second rule that prohibits a vehicle from approaching a particular distance of another vehicle that has a second priority (P2). The remote AV system 114 can determine that the second priority (P2) is greater than the first priority (P1) and, therefore, identify the second rule as the highest priority rule that the trajectory causes the vehicle to violate.

Based on the highest priority rule that the trajectory causes the vehicle to violate, the remote AV system 114 can assign the scenario score to the simulated scenario. For example, for a simulated scenario, where the trajectory causes the vehicle to violate a rule with a particular priority (P1), the remote AV system 114 can assign a corresponding scenario score to the simulated scenario (S1). In some cases, the priority and the scenario score can have a 1:1 relationship. In some cases, the priority and the scenario score may not have a 1:1 relationship and, instead, can have a mathematical relationship or other relationship. For example, the remote AV system 114 can perform one or more operations (e.g., mathematical operations) to obtain the scenario score from the priority.

The remote AV system 114 can determine a scenario score for each of the simulated scenarios. For example, the remote AV system 114 can determine scenario scores for each of a plurality of simulated scenarios (e.g., over 100 simulated scenarios). The remote AV system 114 can compare the scenario scores for each of the simulated scenarios to identify a highest scenario score as compared to the scenario scores for each of the simulated scenarios. Therefore, the remote AV system 114 can identify a particular simulated scenario with a highest scenario score. The particular simulated scenario can represent a simulated scenario with the highest scenario score (e.g., a simulated scenario that is most likely (as compared to other simulated scenarios) to cause a vehicle to violate a higher priority rule when a lower priority rule could be violated).

The remote AV system 114 can generate a test using the identified simulated scenario. The remote AV system 114 can generate the test for the control system of the vehicle. In the execution of the test by the control system of the vehicle, the control system of the vehicle can simulate the performance of the vehicle in the simulated scenario. Based on the simulation of the performance of the vehicle, the remote AV system 114 can identify how the vehicle would react for the particular trajectory (e.g., a particular rule that is violated by the vehicle). Further, the remote AV system 114 can identify how to adjust a control strategy of the control system of the vehicle such that a lower priority rule is violated by the vehicle for the simulated scenario. Therefore, the remote AV system 114 (or a separate system) can utilize the simulated scenario to train and/or test a control system of a vehicle.

Figure 11:
FIG. 11 is a block diagram illustrating an example of a signal processing system.

FIG. 11 is a block diagram illustrating an example of a signal processing environment 1100. In the illustrated example, the signal processing environment 1100 includes a signal processing system 1102 communicatively coupled with a computing device 1104, a computing device 1110, and a computing device 1114. All or a portion of computing device 1104, computing device 1110, and computing device 1114 can be the same as or similar to device 300 as described in FIG. 3. In some cases, the signal processing environment 1100 and/or the signal processing system 1102 can form at least a part of the planning system 404, described herein at least with reference to FIG. 4. The signal processing system 1102 can receive parameter data 1106, and use the parameter data 1106 to generate simulated scenarios for the vehicle.

The signal processing system 1102 (or another computing system) can initialize a control system testing process. For example, the signal processing system 1102 can receive a request from a computing device (e.g., a user computing device) to test and/or train the control system of a vehicle. In some cases, the signal processing system 1102 can receive a request to generate a test for the control system of the vehicle. In response, the signal processing system 1102 can initialize a control system testing process to generate a simulated scenario to test the control system of the vehicle. In some cases, the signal processing system 1102 can test the control system of the vehicle using the simulated scenario to determine how the control system of the vehicle reacts to a given simulated scenario.

The computing device 1104 provides parameter data 1106 associated with an environment of a vehicle to the signal processing system 1102. In some cases, the signal processing system 1102 causes the computing device 1104 to provide the parameter data 1106 based on the initialization of the control system testing process. The computing device 1104 can be a computing device for generating simulated environment data (e.g., parameters identifying a simulated environment). The simulated environment can include simulated environment parameters (e.g., road data, sidewalk data, etc.) and simulated agents (e.g., defined by one or more agent parameters). The computing device 1104 can provide the parameter data 1106 to the signal processing system 1102 to train and/or test a control system of a vehicle. In some cases, the computing device 1104 can be in communication with a sensor. For example, the computing device 1104 can be in communication with (e.g., receive sensor data from) a location sensor (e.g., a global positioning sensor) associated with (e.g., located in, affixed to, etc.) a vehicle. The computing device 1104 can generate a simulated environment based on the sensor data (e.g., the simulated environment can correspond to and/or can be based or sensor data identifying a real world environment encountered by a vehicle). In some embodiments, the computing device 1104 can be in communication with a plurality of sensors (e.g., a plurality of different location sensors associated with different vehicles) that each generates and/or provides parameter data to the computing device 1104. Similarly, the parameter data 1106 can include different types of parameter data. For example, the parameter data 1106 can include static data that is not modifiable by the signal processing system 1102 and/or dynamic data that is modifiable by the signal processing system 1102. In some cases, the computing device 1104 generates parameter data 1106 based on one or more settings (e.g., a time period). The parameter data 1106 can include streaming data and/or batch data.

In the illustrated example, the signal processing system 1102 includes a signal processor 1108 to receive the parameter data 1106, however, it will be understood that the signal processing system 1102 can include fewer, more, or different components. The signal processor 1108 can process the parameter data 1106 to generate simulated scenario data.

The signal processor 1108 can also receive rule data 1112 associated with a hierarchical plurality of rules. The signal processor 1108 can receive the rule data 1112 from a computing device 1110 and/or a data store. In some cases, the signal processor 1108 parses the rule data 1112 to identify a subset of the rule data 1112 associated with a particular vehicle. For example, the signal processor 1108 can parse the rule data 1112 to identify a subset of the rule data 1112 associated with a particular region or location where a vehicle is located, a particular vehicle type of the vehicle, a user associated with a vehicle, etc.

The rule data 1112 can include a hierarchical plurality of rules (e.g., a rulebook). For example, the rule data 1112 can identify a plurality of rules that are ordered or ranked based on a priority of each rule. As discussed above, a rule can have a priority with respect to all or a portion of the other rules. For example, the rule data 1112 can identify the following rules, in increasing order of priority: 1: maintain a predetermined speed limit; 2: stay in lane; 3: maintain a predetermined clearance; 4: reach goal; 5: avoid collisions. The priority of the rule can represent a risk level of a violation of the rule. For example, a collision can have a high risk level as compared to exceeding a speed limit. Therefore, the rule data 1112 can include an ordered set of rules (e.g., based on traffic laws, cultural expectations of driving behavior, a destination, a time for reaching the destination, etc.) and a priority of each rule.

Based on the parameter data 1106 (e.g., an environment for the vehicle), the signal processor 1108 can build a simulated scenario for the vehicle. To build the simulated scenario, the signal processor 1108 can identify one or more environmental parameters and one or more simulated agents from the parameter data 1106. For example, environmental parameters can include one or more of a road, a sidewalk, a tree, a sign, etc. and the simulated agents can include one or more of another vehicle, a pedestrian, a bicycle, a motorcycle, etc. The simulated scenario can include each of the environmental parameters and the simulated agents. For example, the simulated scenario can include a road, a sidewalk, a tree, etc. and/or another vehicle, a pedestrian, etc. The environmental parameters (e.g., the road, the tree, etc.), the number of simulated agents (e.g., 1, 2, 3, etc.), and/or the type of simulated agents (e.g., a vehicle, a pedestrian, a bicycle, a plane, etc.) can be static parameters. For example, the environmental parameters, the number of simulated agents, and/or the type of simulated agents can be invariable with respect to a series of simulated scenarios. Further, the signal processor 1108 can utilize a series of simulated scenarios to test the control system of the vehicle and all or a portion of the series of simulated scenarios can include the same static parameters. In some cases, all or a portion of the environmental parameters can be dynamic parameters.

All or a portion of the simulated agents can include agent parameters. The agent parameters can define a behavior (e.g., aggressive, angry, mild, careful, etc.), an action (e.g., crossing a street, passing another vehicle, standing in the street, driving against traffic, etc.), a location (e.g., in the street, on a sidewalk, etc.), and/or any other parameter for a simulated agent. All or a portion of the agent parameters can be dynamic parameters for the series of simulated scenarios. For example, all or a portion of the agent parameters can be variable and can vary across the series of simulated scenarios. In some cases, all or a portion of the agent parameters can be static parameters.

To generate the series of simulated scenarios, the signal processor 1108 can identify the parameter data 1106 and vary all or a portion of the dynamic parameters of the parameter data 1106. The signal processor 1108 can generate a simulated scenario for all or a portion of the combinations of values for the dynamic parameters of the parameter data 1106. For example, in a first simulated scenario, a pedestrian can cross the street at a first location, in a second simulated scenario, the pedestrian can cross the street at a second location, in a third simulated scenario, the pedestrian can stand in the street, in a fourth simulated scenario, the pedestrian can stand on a sidewalk, in a fifth simulated scenario, the pedestrian can indicate that they are waiting to cross the street, etc.

The signal processor 1108 can identify a trajectory for a simulated vehicle within the simulated scenario built by the signal processor 1108. The trajectory can indicate movement of the vehicle from a first pose to a second pose. In some cases, the signal processor 1108 can receive the trajectory as parameter data 1106. In other cases, the signal processor 1108 can receive the trajectory separately from the parameter data 1106. For example, the signal processor 1108 can receive the trajectory from a computing device (e.g., a sensor) of the vehicle). The trajectory can include or can be based on historical movement of the vehicle. For example, the sensor can monitor movement of the vehicle and report the movement of the vehicle to the signal processor 1108. Further, the trajectory can be based on historical, real-world movement of the vehicle and/or a common movement of the vehicle as compared to other movements of the vehicle (e.g., a frequent movement of the vehicle as compared to other movements of the vehicle).

The signal processor 1108 can identify a violation of a rule for all or a portion of the simulated scenarios based on the trajectory of the simulated vehicle within the simulated scenario. The signal processor 1108 can identify the violation of a rule using the rule data 1112. The signal processor 1108 can identify a rule, from the rule data 1112, that the trajectory may cause a vehicle to violate.

The signal processor 1108 can identify a priority of the rule that the trajectory may cause the simulated vehicle to violate based on the hierarchical plurality of rules of the rule data 1112. For example, the violated rule can include speed-related rules, collision-related rules, lane-related rules, destination-related rules, etc. Therefore, the signal processor 1108 can identify the priority of the rule using the hierarchical plurality of rules.

In some cases, the signal processor 1108 can determine that a trajectory may cause a vehicle to violate multiple rules of the hierarchical plurality of rules based on a particular simulated scenario. The signal processor 1108 can compare the priority of all or a portion of the multiple rules to identify a rule with a highest priority as compared to the other multiple rules. Based on identifying the rule with the highest priority, the signal processor 1108 can utilize the rule with the highest priority as the rule for the particular simulated scenario.

In some cases, the signal processor 1108 can utilize different trajectories for all or a portion of the simulated scenarios. Further, the signal processor 1108 can utilize a combination of trajectories for all or a portion of the simulated scenarios. The combination of trajectories can include trajectories for the same planning step and/or trajectories for the same planning step. For example, the combination of trajectories can include multiple different trajectories for moving from a first pose to a second pose and/or a first trajectory for moving from a first pose to a second pose, a second trajectory for moving from the second pose to a third pose, etc. For the combination of trajectories, the signal processor 1108 can identify a priority of a rule that the combination of trajectories causes a vehicle to violate. For example, the signal processor 1108 can identify multiple rules that the combination of trajectories causes a vehicle to violate and can identify a rule with the highest priority compared to other rules that the combination of trajectories causes a vehicle to violate. In another example, the signal processor 1108 can identify a rule that a final trajectory of the combination of trajectories causes a vehicle to violate. The signal processor 1108 can compare a priority for all or a portion of the combination of trajectories to identify a combination of trajectories associated with a highest priority as compared to the other combinations of trajectories.

The signal processor 1108 can utilize the priority of the rule to identify a scenario score for all or a portion of the simulated scenarios. The priority of the rule and the scenario score can have a 1:1 relationship, a mathematical relationship, or any other relationship. For example, a user, via a user computing device, can assign a relationship between the priority of the rule and the scenario score. The scenario score can be a comparative measure of a particular simulated scenario of the plurality of simulated scenarios and can represent the likelihood that a particular simulated scenario causes a vehicle to violate a high priority rule from the hierarchical plurality of rules. In one embodiment, the scenario score can include a ranking on a scale of 1 to 10 with 1 indicating that the simulated scenario is unlikely to cause a vehicle to violate a high priority rule and 10 indicating that the simulated scenario is likely to cause the vehicle to violate the high priority rule.

Based on the scenario scores, the signal processor 1108 can identify one or more simulated scenarios for testing of the vehicle. For example, the signal processor 1108 can utilize the scenario scores to identify one or more simulated scenarios that are likely to cause a vehicle to violate a high priority rule as compared to other simulated scenarios. In some cases, the signal processor 1108 may not identify scenario scores for all or a portion of the simulated scenarios. Instead, the signal processor 1108 can compare the priority of violated rules to identify one or more simulated scenarios for testing of the vehicle.

Based on identifying the one or more simulated scenarios, the signal processor 1108 can determine data to be routed to a computing device 1114. For example, the signal processor 1108 can determine that a control system of a vehicle should be tested or trained using the one or more simulated scenarios. Therefore, the signal processor 1108 can train and/or test the control system of the vehicle using the one or more simulated scenarios. Accordingly, the signal processor 1108 can provide the data to the computing device 1114.

Example Simulated Scenario for a Vehicle

Figure 12:
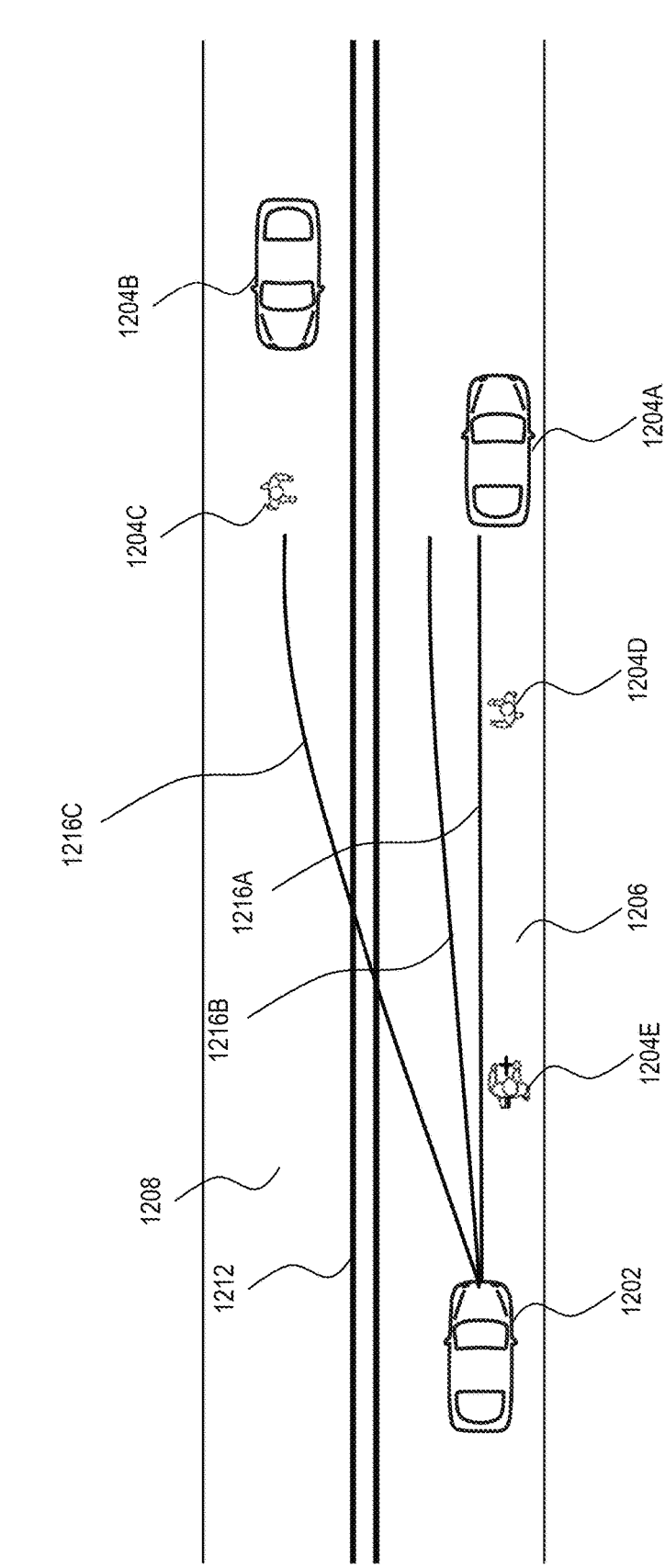
FIG. 12 is an example environment in which a vehicle including one or more components of an autonomous system can be implemented.

FIG. 12 is an example environment 1200 illustrating an example of a vehicle 1202 (e.g., a vehicle that is the same as, or similar to, vehicles 102 and/or vehicle 200) that is associated with an initial pose. The example environment 1200 can illustrate a simulated scenario for a simulated vehicle (e.g., the vehicle 1202). The simulated scenario may be a scenario for testing the control system of a vehicle. For example, a system can provide the simulated scenario to the control system of the vehicle to determine how the vehicle responds to the particular simulated scenario and train the control system of the vehicle accordingly. The simulated scenario may be one of a series of simulated scenarios that can be used to train and/or test the control system of the vehicle. The simulated scenario can include one or more environmental parameters (e.g., 1206, 1208, 1212) and one or more simulated agents (e.g., 1204A, 1204B, 1204C, 1204D). Each of the simulated agents may be configured according to one or more agent parameters (e.g., dynamic agent parameters). A system (e.g., the signal processing system 1102 of FIG. 11) can generate a series of simulated scenarios by varying all or a portion of the agent parameters. For example, all or a portion of the series of simulated scenarios can correspond to a particular combination of agent parameter values (e.g., a unique combination of agent parameter values).

The vehicle 1202 can have an initial pose to identify an initial location, a starting location, etc. of the vehicle 1202. Based on the initial pose of the vehicle 1202 and a destination of the vehicle 1202, a system (e.g., the signal processing system 1102 of FIG. 11) can identify one or more trajectories for moving to a second pose from the initial pose. All or a portion of the one or more trajectories can identify a different trajectory from the initial pose to a different second pose. In some cases, the one or more trajectories may be defined by a user, via a user computing device. In some cases, the one or more trajectories may be defined by the system based on sensor data, test data, etc.

All or a portion of the combinations of a particular trajectory with a particular environment (e.g., simulated scenario) can result in a significantly different experience for the vehicle and a user of the vehicle (e.g., a different rule violation, a different speed, etc.). For example, a first trajectory in a first simulated scenario can cause the vehicle to speed up, a second trajectory in the first simulated scenario can cause the vehicle to slow down, a third trajectory in a second simulated scenario can cause the vehicle to turn into oncoming traffic, and a fourth trajectory in the second simulated scenario can cause the vehicle to turn into an off ramp. In another example, a first trajectory in a first simulated scenario can cause the vehicle to violate a rule with a first priority (e.g., do not maneuver into a different lane) and the first trajectory in a second simulated scenario can cause the vehicle to violate a rule with a second priority (e.g., do not exceed the speed limit) that is lower compared to the first priority.

As described herein, the signal processing system 1102 can determine a simulated scenario for the vehicle that causes a violation of a highest priority rule as compared to other rule violations caused by other simulated scenarios using the combination of trajectories. By identifying a simulated scenario that causes a violation of a highest priority rule, the signal processing system 1102 can increase the likelihood that the simulated scenario causes a vehicle to violate a higher priority rule when a lower priority rule could be violated instead. Further, by identifying a particular simulated scenario for testing the control system of the vehicle and not testing the control system of the vehicle using all or multiple of the simulated scenarios, the signal processing system 1102 decreases the computational requirements and increases the efficiency of the control system testing process. The signal processing system 1102 can, therefore, improve the accuracy, reliability, and efficiency of the vehicle 1202 and the control system testing process.

In the illustrated example of FIG. 12, the environment 1200 includes the vehicle 1202. The environment 1200 may be similar to the environment 100 as described above with reference to FIG. 1 and/or environment 600 as described above with reference to FIG. 6. The environment 1200 further includes a first simulated agent: vehicle 1204A, a second simulated agent: vehicle 1204B, a third simulated agent: pedestrian 1204C, a fourth simulated agent: pedestrian 1204D, and a fifth simulated agent: pedestrian 1204E. It will be understood that the example environment 1200 may include more, less, or different features, elements, characteristics, actors, etc. For example, the example environment 1200 may include additional vehicles, bicycles, pedestrians, etc.

The example environment 1200 can include one or more environmental parameters (e.g., geographical features). In the example of FIG. 12, the example environment 1200 includes a road that is divided into multiple lanes (lane 1206 and lane 1208). The lanes are divided by a double line 1212. The example environment 1200 may include more, less, or different geographical features and/or artificial features. For example, the example environment 1200 may include a plurality of light sources, a plurality of trees, a median, an off ramp, etc.

The one or more environmental parameters and the simulated agents may be static parameters. Therefore, the one or more environmental parameters and the simulated agents may not vary across the series of simulated scenarios. Instead, all or a portion of the simulated scenarios can include the one or more environmental parameters and the simulated agents. In some cases, the trajectory or trajectories of the vehicle 1202 may be a static parameter. For example, the vehicle 1202 may have the same trajectory or trajectories in all or a portion of the simulated scenarios. In some cases, the trajectory or trajectories of the vehicle 1202 may be a dynamic parameter that can vary across all or a portion of the simulated scenarios.

The simulated agents may be based on one or more agent parameters and corresponding agent parameter values. The agent parameters can include actions of the simulated agents, the types of the simulated agents, and/or the location of the simulated agents. The agent parameters may be dynamic parameters that can vary across all or a portion of the simulated scenarios. To generate the simulated scenario, a system can receive the environmental parameters and the simulated agents. The system can identify particular agent parameter values (e.g., values for the actions of the simulated agents, the types of the simulated agents, and/or the location of the simulated agents) and generate a simulated scenario based on the agent parameter values. In some cases, the system can receive the environmental parameters, the simulated agents, and a base set of agent parameter values. To generate the simulated scenario, the system can modify all or a portion of the base set of agent parameter values. Therefore, all or a portion of a series of simulated scenarios can include different agent parameter values.

In the example of FIG. 12, the vehicle 1202 is operating in lane 1206. The vehicle 1202 is positioned at an initial pose in the lane 1206. Similarly, vehicle 1204A is positioned in the lane 1206. The vehicle 1204A is stopped at a location within the lane 1206. For example, the vehicle 1204A may be stopped at a location within the lane 1206 due to a mechanical issue, the vehicle 1204A can be picking up or dropping off a passenger, etc. The flow of traffic in lane 1206 is opposite to the flow of traffic in lane 1208.

Vehicle 1204B is positioned in the lane 1208. The vehicle 1204B may be stopped at a location within the lane 1208 or may be moving in a direction opposite the direction of vehicle 1202 (e.g., with the flow of traffic in lane 1208). For example, the vehicle 1204B may be stopped at a location within the lane 1208 due to a mechanical issue, the vehicle 1204B can be picking up or dropping off a passenger, etc.

Pedestrians 1204C, 1204D, 1204E are positioned in the lanes 1206, 1208. The pedestrians 1204C, 1204D, 1204E may be stopped at a location within the lanes 1206, 1208 or may be crossing the lanes 1206, 1208. For example, all or a portion of the pedestrians 1204C, 1204D, 1204E may be moving from one side of the road to the other side of the road.

The example environment 1200 may be associated with a hierarchical plurality of rules. For example, the hierarchical plurality of rules can include rules for vehicles navigating within the example environment 1200. In the example of FIG. 12, the traffic rules in the environment 1200 prohibit a vehicle from crossing the double line 612, exceeding a predetermined speed limit (e.g., 45 miles per hour), approaching a stopped vehicle within a particular distance (e.g., within 5 meters), etc. in accordance with generally understood rules of the road.

In some cases, the vehicle 1202 may be navigating to a destination not described in FIG. 12. For example, the vehicle 1202 may be navigating to a particular destination on a different road.

The example environment 1200 may include more, less, or different objects. For example, the example environment 1200 may include more, less, or different objects that can block a trajectory of the vehicle 1202. Pedestrians, construction, cyclists, etc. can block a trajectory of the vehicle 1202. The vehicle 1202 can utilize a signal processing system (e.g., signal processing system 1102 as described in FIG. 11) to identify the objects and determine how to navigate the example environment 1200.

The signal processing system can identify a plurality of trajectories for the vehicle 1202. The plurality of trajectories for the vehicle 1202 can include driving into lane 1208 due to vehicle 1204A that is stopped in lane 1206, colliding with vehicle 1204A, maneuvering away from the second vehicle 1204A but staying within the lane 1206, driving on a side of the road beside lane 1206, stopping, etc. A trajectory may be associated with a plurality of similar trajectories. For example, the plurality of potential trajectories can include multiple potential trajectories that involve driving into lane 1208. The multiple potential trajectories can include a different degree to which the vehicle 1202 enters the lane 1208, a different speed when driving in the lane 1208, a different time period for driving in the lane 1208, etc. Therefore, the plurality of potential trajectories can include multiple trajectories that are similar (e.g., multiple trajectories can exceed a threshold value (e.g., 75%) of similarity when compared).

In the example of FIG. 12, the signal processing system identifies the first trajectory 1216A, the second trajectory 1216B, and the third trajectory 1216C. Using the hierarchical plurality of rules, the signal processing system identifies that the first trajectory 1216A causes a violation of a first rule that prohibits collisions with another vehicle, the second trajectory 1216B causes a violation of a second rule that prohibits a vehicle from approaching a particular distance of another vehicle, and the third trajectory 1216C causes a violation of a third rule that prohibits a vehicle from entering a lane of traffic that is flowing in a direction that is oriented differently from a direction of the trajectory. In some cases, the signal processing system identifies a single trajectory (e.g., trajectory 1216A) for the simulated scenario.

Based on determining a rule that each of the trajectories causes the vehicle 1202 to violate in the simulated scenario, the signal processing system can identify a highest priority rule that the trajectories cause the vehicle 1202 to violate. For example, the highest priority rule that the trajectories cause the vehicle 1202 to violate may be a rule prohibiting collision with another vehicle (e.g., based on trajectory 1216A).

The signal processing system can identify a highest priority rule that the trajectories cause the vehicle 1202 to violate for all or a portion of a series of simulated scenarios. Based on identifying the highest priority rules, the signal processing system can assign a scenario score to all or a portion of the series of simulated scenarios. The scenario score may be a comparative ranking and/or score for all or a portion of the series of simulated scenarios. For example, the scenario score may be a score between 1 and 10 identifying the priority of a rule violated by a trajectory in a particular simulated scenario. In some cases, the scenario score may be based on a combination of all or a portion of the rules violated by a trajectory in a particular simulated scenario (e.g., a sum of the priorities of the rules), a number of the highest priority rules violated by a trajectory in the particular simulated scenario, etc.

Based on the scenario scores, the signal processing system can identify a particular simulated scenario. The signal processing system can train and/or test a control system of a vehicle using the particular simulated scenario.

Example Operating Diagrams of a Signal Processor

Figure 13B:
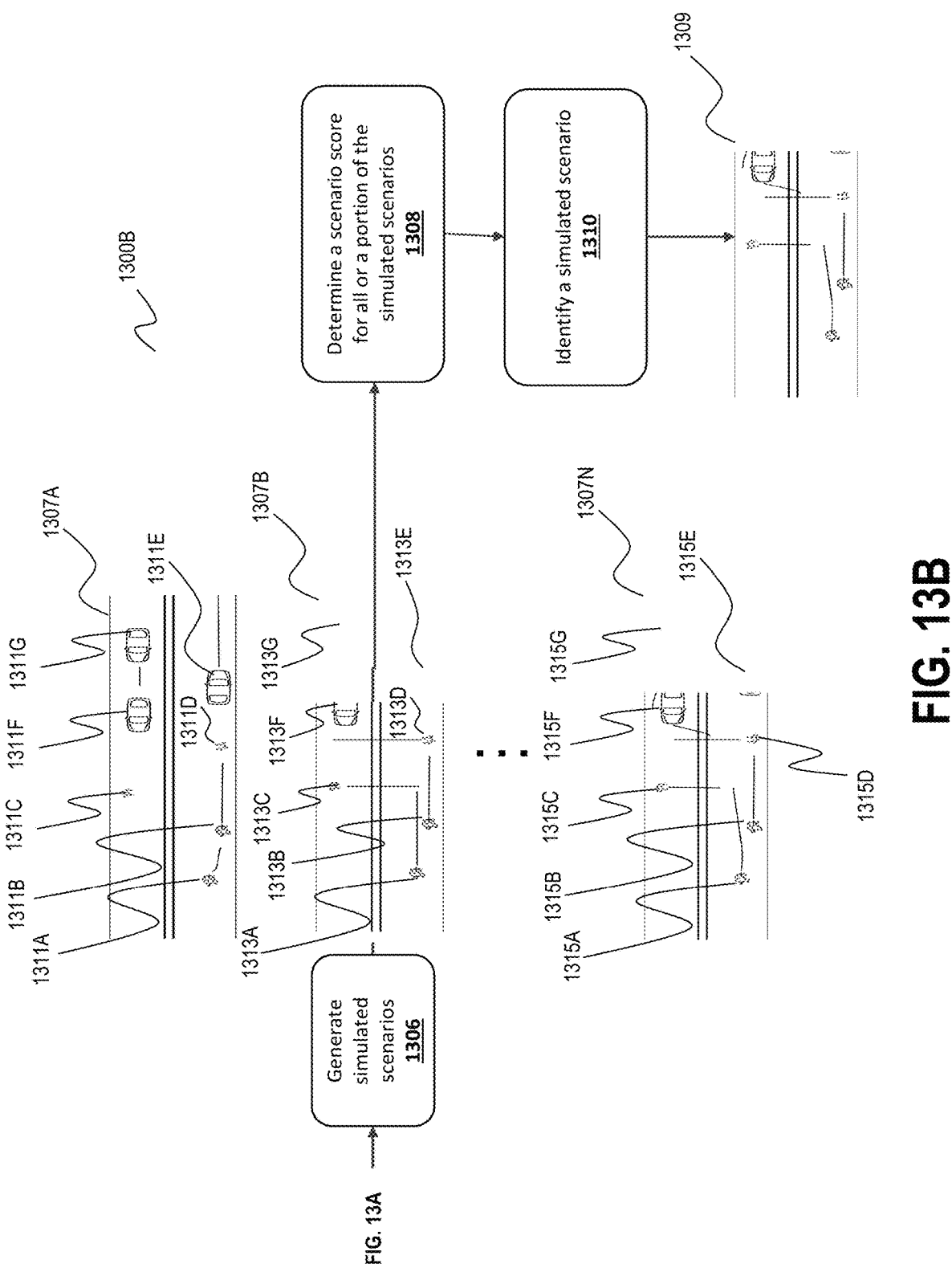
FIG. 13B is a flow diagram illustrating an example identification of a simulated scenario for a simulated vehicle.

FIGS. 13A and 13B are operation diagrams illustrating a data flow for identifying a simulated scenario for testing and/or training a control system of a vehicle. Specifically, FIGS. 13A and 13B are operation diagrams illustrating a data flow for determining a simulated environment, identifying a trajectory of a simulated vehicle, generating simulated scenarios, determining scenario scores for the simulated scenarios, and identifying a simulated scenario. Any component of the remote AV system 114 can facilitate the data flow for identifying a simulated scenario for testing and/or training a control system of a vehicle. In some embodiments, a different component can facilitate the data flow. In the example of FIG. 13A and FIG. 13B, a signal processing system facilitates the data flow.

At step 1302, the signal processing system determines a simulated environment 1303. The signal processing system generates the simulated environment 1303 from parameter data. The parameter data can include environmental parameter(s) and/or simulated agent(s). In the illustrated example, the parameter data includes environmental parameters indicating a two lane road with a marking between the two lanes. Further, the parameter data includes simulated agents including pedestrians and vehicles. In the illustrated example, the environmental parameters and simulated agents are illustrated as a single example environment, however, it will be understood that the simulated environment 1303 can be defined in a different manner. For example, the environmental parameters and simulated agents can be separately provided, defined, or illustrated.

In some cases, the signal processing system (or a separate system) can obtain input defining the simulated environment 1303 (e.g., the environmental parameter(s) and/or the simulated agent(s)). The signal processing system can cause a computing device to display a user interface that receives input defining the simulated environment 1303. For example, the user interface can display a selection of environmental parameters and/or simulated agents for selection. In some cases, the user interface can receive written, audible, and/or image-based input defining the environmental parameters and/or simulated agents.

At step 1304, the signal processing system identifies a trajectory 1305 of a simulated vehicle. In some cases, the signal processing system can identify multiple trajectories of the simulated vehicle. The signal processing system identifies the trajectory 1305 as a movement from an initial pose of the simulated vehicle. In the illustrated example, the trajectory 1305 is illustrated within an example environment, however, it will be understood that the trajectory 1305 may be defined in a different manner. For example, the trajectory 1305 may be defined as a series of intermediate poses between a first pose and a second pose.

In some cases, the signal processing system (or a separate system) can obtain input defining the trajectory 1305 (e.g., a first pose and a second pose associated with a given movement of the simulated vehicle). The signal processing system can cause a computing device to display a user interface that receives input defining the trajectory 1305. For example, the user interface can display a selection of trajectories for selection. In some cases, the user interface can receive written, audible, and/or image-based input defining the trajectory 1305. In some cases, the user interface can receive input defining the environmental parameters, the simulated agents, and/or the trajectory 1305.

Based on identifying the trajectory 1305 and determining the simulated environment 1303, the signal processing system can maintain the trajectory 1305 within the simulated environment 1303. The signal processing system can maintain the trajectory 1305 within the simulated environment 1303 to identify one or more simulated scenarios for the simulated vehicle.

FIG. 13B is an operation diagram 1300B for generating simulated scenarios and identifying a particular simulated scenario for testing a control system of a vehicle. The operation diagram 1300A may correspond to a first step in the control system testing process and the operation diagram 1300B may correspond to a second, subsequent step in the control system testing process. In some examples, the first step and the second step are separated by one or more intermediate steps.

At step 1306, the signal processing system generates simulated scenarios 1307A, 1307B, . . . , 1307N for the simulated vehicle. The simulated scenarios 1307A, 1307B, . . . , 1307N include the simulated environment 1303. Specifically, the simulated scenarios 1307A, 1307B, . . . , 1307N include the environmental parameters and the simulated agents indicated in the simulated environment 1303.

The signal processing system can generate the simulated scenarios 1307A, 1307B, . . . , 1307N by modifying (e.g., varying) agent parameter values of the simulated agents of the simulated environment 1303. As discussed above, the agent parameter values can indicate a status, an action, an agent type, a location, etc. of a simulated agent. In the illustrated example, the agent parameter values indicate an action of a simulated agent. For example, the agent parameter values can indicate whether a simulated agent is moving in a straight line, not moving, moving in a non-straight line, slowing down, accelerating, etc. Further, the agent parameter values can indicate a speed, size, etc. of the simulated agent.

All or a portion of the simulated scenarios 1307A, 1307B, . . . , 1307N may correspond to a particular combination of agent parameter values. For example, the first simulated scenario 1307A corresponds to a first combination of agent parameter values that indicates a first bicycle 1311A is moving to a side of the road in a first lane of the road, a second bicycle 1311B is moving in a straight line in the first lane, a first pedestrian 1311C and a second pedestrian 1311D are standing on opposite sides of the road, a first vehicle 1311E is in the first lane and moving with the flow of traffic, a second vehicle 1311F is stopped in a second lane of the road, and a third vehicle 1311G is in the second lane of the road and moving towards the second vehicle 1311F. The second simulated scenario 1307B corresponds to a second combination of agent parameter values that indicates the first bicycle 1313A and the second bicycle 1313B are moving in a straight line in a first lane of the road, a first pedestrian 1313C and a second pedestrian 1313D are walking into respective lanes of the road and moving in opposite directions, the first vehicle 1313E is in the first lane and moving with the flow of traffic, the second vehicle 1313F is stopped in the second lane, and the third vehicle 1313G is in the second lane and moving towards the second vehicle 1313F. The nth simulated scenario 1307N corresponds to an nth combination of agent parameter values that indicates the first bicycle 1315A is moving further into a first lane of the road, the second bicycle 1315B is moving in a straight line in the first lane, a first pedestrian 1315C and a second pedestrian 1315D are walking into respective lanes of the road and moving in opposite directions, the first vehicle 1315E is in the first lane and is stopped, the second vehicle 1315F is in the second lane and is moving to avoid hitting one of the pedestrians, and the third vehicle 1315G is in the second lane and is moving to avoid hitting the second vehicle 1315F.

It will be understood that the simulated scenarios 1307A, 1307B, . . . , 1307N can include any number of simulated scenarios. As all or a portion of the simulated scenarios 1307A, 1307B, . . . , 1307N can include a particular combination (e.g., a unique or distinct combination) of agent parameter values, the simulated scenarios 1307A, 1307B, . . . , 1307N can include 100, 1,000, 10,000, etc. simulated scenarios.

Though not identified in the illustrated example, the simulated scenarios 1307A, 1307B, . . . , 1307N can further indicate the trajectory of the simulated vehicle (previously identified). For example, the simulated scenarios 1307A, 1307B, . . . , 1307N can indicate the trajectory of the simulated vehicle relative to the simulated agents and/or the environmental parameters of the simulated scenarios 1307A, 1307B, . . . , 1307N.

At step 1308, the signal processing system determines a scenario score for all or a portion of the simulated scenarios 1307A, 1307B, . . . , 1307N. To determine a respective scenario score for all or a portion of the simulated scenarios 1307A, 1307B, . . . , 1307N, the signal processing system can identify rule data that identifies a plurality of hierarchical rules and a priority of all or a portion of the rules. Using the rule data, the signal processing system can identify, for all or a portion of the simulated scenarios 1307A, 1307B, . . . , 1307N, a rule that the trajectory within the particular simulated scenario causes a vehicle to violate. The signal processing system can compare the priority of the rules violated by the trajectory. Based on comparing the priority of the rules violated by the trajectory, the signal processing system can identify a rule to be violated by the simulated vehicle with a highest priority as compared to other rules that the trajectory causes to be violated. In some cases, the signal processing system can identify a rule to be violated by the simulated vehicle with a highest priority as compared to other rules that other trajectories of the particular simulated scenario cause the vehicle to violate. Therefore, the signal processing system can identify a rule violated by the simulated vehicle with a highest priority as compared to other violated rules.

Based on the identified priority of the rule violated by the simulated vehicle with the highest priority, the signal processing system can assign a scenario score to/for all or a portion of the simulated scenarios 1307A, 1307B, . . . , 1307N. As discussed above, the signal processing can generate the scenario score for a particular simulated scenario based on the identified priority of the rule violated by the simulated vehicle within the particular simulated scenario with the highest priority.

At step 1310, the signal processing system identifies a simulated scenario 1310. The simulated scenario 1310 can be a simulated scenario with the highest scenario score as compared to the scenario scores of all or a portion of the simulated scenarios 1307A, 1307B, . . . , 1307N. By identifying the simulated scenario 1310, the signal processing system can identify a simulated scenario that is most likely to cause a vehicle to violate a high priority rule when a lower priority rule could be violated instead as compared to other simulated scenarios of the simulated scenarios 1307A, 1307B, . . . , 1307N. Because the simulated scenario 1310 has a highest scenario score (e.g., causes a vehicle to violate a higher priority rule as compared to other simulated scenarios of the simulated scenarios 1307A, 1307B, . . . , 1307N), a vehicle may be more likely to violate the higher priority rule when a lower priority rule could be violated instead as compared to other simulated scenarios that may not cause a vehicle to violate a rule or may cause a vehicle to violate a low priority rule.

The signal processing system can route the simulated scenario to a computing device or a data store. In some cases, the signal processing system can route the simulated scenario to a control system of a vehicle and/or to a computing device for training and/or testing.

As described herein, the path generation process can be repeated thousands, hundreds of thousands, millions, or more times in order to generate simulated scenarios for a control system of a vehicle. The signal processing system can generate simulated scenarios for different vehicles, for vehicles operating in different environments, for vehicles with different capabilities or characteristics, etc. By providing a simulated scenario that causes a vehicle to violate a high priority rule, the signal processing system can increase the likelihood that the signal processing system can identify how to adjust the control strategy of the control system of the vehicle to cause the vehicle to violate a lower priority rule instead of the high priority rule. These additional features can enable the signal processing system to accurately and efficiently train and/or test the control system of a vehicle.

In addition, during the path generation process, some of the functions or elements described herein may not be used or may not be present. For example, during the process, the signal processing system may not determine scenario scores for all or a portion of the simulated scenarios.

Example Flow Diagram of a Signal Processor

FIG. 14 is a flow diagram illustrating an example of a routine 1400 implemented by one or more processors (e.g., one or more processors of the signal processing system 1102). In some embodiments, an example of routine 1400 is implemented by autonomous vehicle compute 400. The flow diagram illustrated in FIG. 14 is provided for illustrative purposes only. It will be understood that one or more of the steps of the routine illustrated in FIG. 14 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 1402, the signal processing system 1102 determines a simulated environment. The simulated environment can include a plurality of simulated environmental parameters and at least one simulated agent. For example, the at least one simulated agent can include a pedestrian, a bicyclist, a passenger, a vehicle, a driver of another vehicle, etc. The simulated environmental parameters can indicate the presence of, characteristics of, etc. a road, a sidewalk, a tree, a bush, a sign, etc. The at least one simulated agent can include at least one agent parameter. The at least one agent parameter can indicate a value identifying a location, a type, an action, a status, a nature, etc. of the at least one simulated agent. For example, the at least one agent parameter can indicate an action of walking on a sidewalk, entering a lane, entering a crosswalk, changing lanes, accelerating, parking, braking, turning, etc. for the at least one simulated agent. In another example, the at least one agent parameter can indicate a location of in a street, in a crosswalk, in and/or on a sidewalk, etc. for the at least one simulated agent. In another example, the at least one agent parameter can indicate a nature of an aggressive nature or a passive nature of the at least one simulated agent.

In some cases, the environmental parameters and the simulated agents may be static parameters and the agent parameters may be dynamic or static parameters. For example, the agent parameters may be modified to generate the simulated scenarios for testing the control system of a vehicle.

In some cases, the signal processing system 1102 can select the simulated environment from a plurality of simulated environments. For example, a first simulated environment can include a two lane road, a second simulated environment can include a one lane road, a third simulated environment can include a bridge, and a fourth simulated environment can include a tunnel.

At block 1404, the signal processing system 1102 receives a plurality of autonomous vehicle rules and a hierarchy for the plurality of autonomous vehicle rules. The signal processing system 1102 can receive rule data identifying a hierarchical plurality of rules. All or a portion of the hierarchical plurality of rules can have a priority with respect to all or a portion of the other rules of the hierarchical plurality of rules. For example, a rule can indicate that the vehicle is to maintain a distance from a parked vehicle, the vehicle is to reach a destination, the vehicle is to stay in a lane, etc.

At block 1406, the signal processing system 1102 determines a trajectory of a simulated autonomous vehicle within the simulated environment. The signal processing system 1102 can generate the trajectory based on a previously identified trajectory. In some cases, the signal processing system can generate the trajectory based on a set of provided poses. The trajectory can represent operation or movement of the vehicle from a first pose (e.g., a source) to a second pose (e.g., a destination). In some cases, the signal processing system 1102 can determine multiple trajectories of the simulated vehicle.

In some embodiments, to generate the trajectory, the signal processing system 1102 applies vehicle dynamics (e.g., a speed of the vehicle, an orientation of the vehicle, an acceleration of the vehicle, etc.) to trajectories. For example, the signal processing system 1102 can generate the trajectory by applying first vehicle dynamics associated with the first pose to trajectories associated with a location of the first pose.

The trajectory can include static trajectories, dynamic trajectories, sampled trajectories, and/or trajectories based on a control method. For example, the signal processing system 1102 can periodically or continuously update the trajectory.

In some cases, the signal processing system 1102 can select the trajectory from a set of trajectories based on one or more factors. For example, the signal processing system 1102 can select the trajectory based on a spatial length, a type, and/or a time period of the trajectory.

In some cases, the signal processing system 1102 assigns a weight to the trajectory. For example, the signal processing system 1102 can assign a rule violation value to the trajectory. The weight can identify a risk associated with a particular trajectory and the given rule violation value.

At block 1408, the signal processing system 1102 generates a plurality of simulated scenarios for the simulated autonomous vehicle. To generate the plurality of simulated scenarios, the signal processing system 1102 can modify the at least one agent parameter of the at least one simulated agent. Modifying the at least one agent parameter can include adding an agent parameter, removing an agent parameter, or modifying a value for and/or associated with an agent parameter. All or a portion of the plurality of simulated scenarios can include different values for the at least one agent parameter.

At block 1410, the signal processing system 1102 identifies a violation of an autonomous vehicle rule for simulated scenarios of the plurality of simulated scenarios. The signal processing system can determine the trajectory, in the particular simulated scenario, causes a vehicle to violate a first rule (e.g., a first behavioral rule) of a hierarchical plurality of rules. Further, the signal processing system can identify a position of the autonomous vehicle rule within the hierarchical plurality of rules. For example, the first rule may be associated with a first priority (based on the hierarchical plurality of rules). The signal processing system 1102 can identify the trajectory or a different trajectory, in the particular simulated scenario, causes a vehicle to violate another rule. Therefore, the signal processing system can identify one or more rules violated by one or more trajectories in a particular simulated scenario.

At block 1412, the signal processing system 1102 determines a scenario score for simulated scenarios of the plurality of simulated scenarios. To determine the scenario score for the simulated scenarios, the signal processing system 1102 can compare the priorities of the rules violated by one or more trajectories in the particular simulated scenario. Further, the signal processing system 1102 can determine a first priority of a first rule that the one or more trajectories cause the simulated vehicle to violate is greater than all or a portion of the priorities of other rules that the one or more trajectories cause the vehicle to violate. Based on determining that the first priority is greater than a priority of other rules violated by the one or more trajectories in the simulated scenario, the signal processing system can assign the first priority (e.g., a rule score) to the simulated scenario.

Based on the priority assigned to a respective simulated scenario, the signal processing system can identify a particular scenario score to all or a portion of the simulated scenarios. The scenario score can represent the priority of a highest priority rule violated by one or more trajectories in a corresponding simulated scenario.

At block 1414, the signal processing system 1102 identifies at least one simulated scenario for a trained neural network of an autonomous vehicle. The signal processing system 1102 can identify the at least one simulated scenario by comparing the scenario scores to identify a simulated scenario with a greatest scenario score as compared to all or a portion of the other simulated scenarios. In some cases, identifying the at least one simulated scenario is based on brute force optimization, simulated annealing, and/or particle swarm optimization.

The signal processing system 1102 can route the simulated scenario to a computing device associated with the trained neural network. For example, the signal processing system 1102 can route the simulated scenario to a computing device for testing and/or training of the trained neural network, for navigation of a vehicle, etc. In some cases, the signal processing system 1102 can train the trained neural network to represent a control system of the vehicle. The signal processing system 1102 can route the simulated scenario to retrain and/or test a previously trained neural network. Specifically, the signal processing system 1102 can generate a test for the trained neural network based on the simulated scenario and implement the test. Based on implementation of the test, the trained neural network can identify a trajectory of the vehicle and provide the trajectory of the vehicle to the signal processing system 1102. For example, the trained neural network can identify the trajectory using minimum-violation planning and/or model predictive control. The signal processing system 1102 can transmit a message to the control system of the vehicle to operate (cause operation of the vehicle) based on implementation of the test (e.g., training and/or testing the trained neural network).

In some cases, the signal processing system 1102 causes display of the simulated scenario via a display of a computing device. Further, the signal processing system 1102 can cause display of an indicator of the rules violated based on a particular simulated scenario.

It will be understood that the routine 1400 can be repeated multiple times using different simulated scenarios (e.g., different environmental parameters, different simulated agents, etc.) and/or different trajectories. In some cases, the signal processing system 1102 iteratively repeats the routine 1400 for multiple vehicles. Further, the signal processing system 1102 can repeat the routine 1400 for the same vehicle during different time periods.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method comprising:

determining, with at least one processor, a simulated environment, wherein the simulated environment includes a plurality of simulated environmental parameters and at least one simulated agent, wherein the at least one simulated agent comprises at least one agent parameter;

receiving a plurality of autonomous vehicle rules and a hierarchy for the plurality of autonomous vehicle rules;

determining, with the at least one processor, a trajectory of a simulated autonomous vehicle within the simulated environment;

generating a plurality of simulated scenarios for the simulated autonomous vehicle, wherein generating a particular simulated scenario of the plurality of simulated scenarios comprises modifying the at least one agent parameter of the at least one simulated agent;

identifying at least one violation of at least one autonomous vehicle rule by the simulated autonomous vehicle in a set of simulated scenarios of the plurality of simulated scenarios, wherein the at least one violation of the at least one autonomous vehicle rule is based on a response of the simulated autonomous vehicle to the set of simulated scenarios;

determining a set of rule violation priorities for the set of simulated scenarios, the set of rule violation priorities comprising a respective rule violation priority for each respective simulated scenario of the set of simulated scenarios based on the at least one violation of at least one autonomous vehicle rule and a position of the at least one autonomous vehicle rule within the hierarchy for the plurality of autonomous vehicle rules;

comparing the set of rule violation priorities;

based on comparing the set of rule violation priorities, determining that a simulated scenario of the set of simulated scenarios is more likely, as compared to other simulated scenarios of the set of simulated scenarios, to cause a trained neural network of an autonomous vehicle to identify a first trajectory of the autonomous vehicle that violates a first autonomous vehicle rule of the plurality of autonomous vehicle rules with a first rule violation priority instead of a second autonomous vehicle rule of the plurality of autonomous vehicle rules with a second rule violation priority, wherein the first rule violation priority exceeds the second rule violation priority;

in response to determining that the simulated scenario is more likely to cause the trained neural network to identify the first trajectory that violates the first autonomous vehicle rule instead of the second autonomous vehicle rule, selecting the simulated scenario from the set of simulated scenarios to test a response of the trained neural network to the simulated scenario;

providing the simulated scenario to a computing device associated with the trained neural network based on selecting the simulated scenario, wherein the trained neural network is configured to respond to the simulated scenario by identifying a respective trajectory of the autonomous vehicle based on the simulated scenario; and adjusting and implementing a control strategy of a control system of the autonomous vehicle based on the response of the trained neural network to the simulated scenario such that the simulated scenario causes the trained neural network to identify a second trajectory of the autonomous vehicle that violates the second autonomous vehicle rule instead of the first autonomous vehicle rule.

2. The method of claim 1, wherein the at least one agent parameter comprises at least one location of the at least one simulated agent within the simulated environment.

3. The method of claim 1, wherein the at least one simulated agent comprises at least one of a pedestrian, a bicyclist, or a passenger or driver of another vehicle.

4. The method of claim 1, wherein the at least one agent parameter comprises at least one action of the at least one simulated agent, wherein the at least one action comprises at least one of walking on a sidewalk, entering a lane, entering a crosswalk, changing lanes, accelerating, parking, braking, or turning.

5. The method of claim 1, wherein the at least one agent parameter comprises at least one location of the at least one simulated agent within the simulated environment, wherein the at least one location comprises at least one of a location in a street, a location in a crosswalk, or a location in a sidewalk.

6. The method of claim 1, wherein the at least one agent parameter comprises a nature of the at least one simulated agent, wherein the nature of the at least one simulated agent comprises an aggressive nature or a passive nature.

7. The method of claim 1, wherein modifying the at least one agent parameter of the at least one simulated agent comprises at least one of:

adding or removing at least one parameter from the at least one agent parameter; or modifying at least one value for the at least one agent parameter.

8. The method of claim 1, further comprising:

generating a test for the trained neural network, wherein the test is based on the simulated scenario; and implementing the test, wherein the response of the trained neural network is based on the implementation of the test.

9. The method of claim 1, further comprising:

generating a test for the trained neural network, wherein the test is based on the simulated scenario;

implementing the test, wherein the response of the trained neural network is based on implementation of the test; and transmitting a message to the control system of the autonomous vehicle to operate the autonomous vehicle based on the implementation of the test.

10. The method of claim 1, further comprising:

generating a test for the trained neural network, wherein the test is based on the simulated scenario; and implementing the test, wherein the trained neural network is configured to identify the respective trajectory of the autonomous vehicle using at least one of minimum-violation planning or a model predictive control, wherein the response is based on implementation of the test.

11. The method of claim 1, wherein the plurality of simulated environmental parameters comprises static parameters and the at least one agent parameter comprises at least one of a static parameter or a dynamic parameter.

12. The method of claim 1, further comprising training the trained neural network to represent the control system of the autonomous vehicle.

13. The method of claim 1, wherein implementation of the trajectory of the simulated autonomous vehicle in the simulated environment based on the simulated scenario causes a violation of the first autonomous vehicle rule, wherein implementation of the trajectory of the simulated autonomous vehicle in the simulated environment based on another simulated scenario causes a violation of the second autonomous vehicle rule, wherein the first autonomous vehicle rule identifies that the simulated autonomous vehicle is to maintain a distance from a simulated parked vehicle and the second autonomous vehicle rule identifies that the simulated autonomous vehicle is to reach a destination or that the simulated autonomous vehicle is to stay in a simulated lane.

14. The method of claim 1, wherein each autonomous vehicle rule of the plurality of autonomous vehicle rules has a respective priority with respect to each other autonomous vehicle rule of the plurality of autonomous vehicle rules.

15. The method of claim 1, wherein determining the trajectory of the simulated autonomous vehicle comprises selecting the trajectory of the simulated autonomous vehicle from a set of trajectories based on at least one of a spatial length of the trajectory, a type of the trajectory, or a time period corresponding to the trajectory.

16. The method of claim 1, wherein selecting the simulated scenario is based on at least one of brute force optimization, simulated annealing, or particle swarm optimization.

17. The method of claim 1, further comprising selecting the simulated environment from a set of simulated environments, wherein the set of simulated environments comprises at least one of a simulated environment including a two lane road, a simulated environment including a one lane road, a simulated environment including a bridge, or a simulated environment including a tunnel.

18. The method of claim 1, further comprising assigning a rule score to each of the plurality of autonomous vehicle rules based on the hierarchy for the plurality of autonomous vehicle rules.

19. A system, comprising:

at least one processor, and at least one non-transitory storage media storing instructions that, when executed by the at least one processor, cause the at least one processor to:

determine a simulated environment, wherein the simulated environment includes a plurality of simulated environmental parameters and at least one simulated agent, wherein the at least one simulated agent comprises at least one agent parameter;

receive a plurality of autonomous vehicle rules and a hierarchy for the plurality of autonomous vehicle rules;

determine a trajectory of a simulated autonomous vehicle within the simulated environment;

generate a plurality of simulated scenarios for the simulated autonomous vehicle, wherein to generate a particular simulated scenario of the plurality of simulated scenarios, execution of the instructions by the at least one processor, causes the at least one processor to modify the at least one agent parameter of the at least one simulated agent;

identify at least one violation of at least one autonomous vehicle rule by the simulated autonomous vehicle in a set of simulated scenarios of the plurality of simulated scenarios, wherein the at least one violation of the at least one autonomous vehicle rule is based on a response of the simulated autonomous vehicle to the set of simulated scenarios;

determine a set of rule violation priorities for the set of simulated scenarios, the set of rule violation priorities comprising a respective rule violation priority for each respective simulated scenario of the set of simulated scenarios based on the at least one violation of at least one autonomous vehicle rule and a position of the at least one autonomous vehicle rule within the hierarchy for the plurality of autonomous vehicle rules;

compare the set of rule violation priorities;

based on comparing the set of rule violation priorities, determine that a simulated scenario of the set of simulated scenarios is more likely, as compared to other simulated scenarios of the set of simulated scenarios, to cause a trained neural network of an autonomous vehicle to identify a first trajectory of the autonomous vehicle that violates a first autonomous vehicle rule of the plurality of autonomous vehicle rules with a first rule violation priority instead of a second autonomous vehicle rule of the plurality of autonomous vehicle rules with a second rule violation priority, wherein the first rule violation priority exceeds the second rule violation priority;

in response to determining that the simulated scenario is more likely to cause the trained neural network to identify the first trajectory that violates the first autonomous vehicle rule instead of the second autonomous vehicle rule, select the simulated scenario from the set of simulated scenarios to test a response of the trained neural network to the simulated scenario;

provide the simulated scenario to a computing device associated with the trained neural network based on selecting the simulated scenario, wherein the trained neural network is configured to respond to the simulated scenario by identifying a respective trajectory of the autonomous vehicle based on the simulated scenario; and adjust and implement a control strategy of a control system of the autonomous vehicle based on the response of the trained neural network to the simulated scenario such that the simulated scenario causes the trained neural network to identify a second trajectory of the autonomous vehicle that violates the second autonomous vehicle rule instead of the first autonomous vehicle rule.

20. At least one non-transitory storage media storing instructions that, when executed by a computing system comprising a processor, cause the computing system to:

determine a simulated environment, wherein the simulated environment includes a plurality of simulated environmental parameters and at least one simulated agent, wherein the at least one simulated agent comprises at least one agent parameter;

receive a plurality of autonomous vehicle rules and a hierarchy for the plurality of autonomous vehicle rules;

determine a trajectory of a simulated autonomous vehicle within the simulated environment;

generate a plurality of simulated scenarios for the simulated autonomous vehicle, wherein to generate a particular simulated scenario of the plurality of simulated scenarios, execution of the instructions by the computing system, causes the computing system to modify the at least one agent parameter of the at least one simulated agent;

identify at least one violation of at least one autonomous vehicle rule by the simulated autonomous vehicle in a set of simulated scenarios of the plurality of simulated scenarios, wherein the at least one violation of the at least one autonomous vehicle rule is based on a response of the simulated autonomous vehicle to the set of simulated scenarios;

determine a set of rule violation priorities for the set of simulated scenarios, the set of rule violation priorities comprising a respective rule violation priority for each respective simulated scenario of the set of simulated scenarios based on the at least one violation of at least one autonomous vehicle rule and a position of the at least one autonomous vehicle rule within the hierarchy for the plurality of autonomous vehicle rules;

compare the set of rule violation priorities;

based on comparing the set of rule violation priorities, determine that a simulated scenario of the set of simulated scenarios is more likely, as compared to other simulated scenarios of the set of simulated scenarios, to cause a trained neural network of an autonomous vehicle to identify a first trajectory of the autonomous vehicle that violates a first autonomous vehicle rule of the plurality of autonomous vehicle rules with a first rule violation priority instead of a second autonomous vehicle rule of the plurality of autonomous vehicle rules with a second rule violation priority, wherein the first rule violation priority exceeds the second rule violation priority;

in response to determining that the simulated scenario is more likely to cause the trained neural network to identify the first trajectory that violates the first autonomous vehicle rule instead of the second autonomous vehicle rule, select the simulated scenario from the set of simulated scenarios to test a response of the trained neural network to the simulated scenario;

provide the simulated scenario to a computing device associated with the trained neural network based on selecting the simulated scenario, wherein the trained neural network is configured to respond to the simulated scenario by identifying a respective trajectory of the autonomous vehicle based on the simulated scenario; and adjust and implement a control strategy of a control system of the autonomous vehicle based on the response of the trained neural network to the simulated scenario such that the simulated scenario causes the trained neural network to identify a second trajectory of the autonomous vehicle that violates the second autonomous vehicle rule instead of the first autonomous vehicle rule.

* * * * *